US011082892B2

(12) United States Patent
Shikari et al.

(10) Patent No.: US 11,082,892 B2
(45) Date of Patent: Aug. 3, 2021

(54) METHODS FOR TRANSMITTING AND RECEIVING DATA IN 5G NR DEVICE BASED ON DATA/SERVICE TAGGING FROM APPLICATION PROCESSOR

(71) Applicant: Apple Inc., Cupertino, CA (US)

(72) Inventors: Murtaza A. Shikari, Mountain View, CA (US); Sethuraman Gurumoorthy, San Jose, CA (US); Srinivasan Nimmala, San Jose, CA (US); Srirang A. Lovlekar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 16/566,163

(22) Filed: Sep. 10, 2019

(65) Prior Publication Data

US 2020/0137673 A1 Apr. 30, 2020

Related U.S. Application Data

(60) Provisional application No. 62/752,900, filed on Oct. 30, 2018.

(51) Int. Cl.
*H04W 28/24* (2009.01)
*H04W 72/08* (2009.01)
(Continued)

(52) U.S. Cl.
CPC .............. *H04W 28/24* (2013.01); *H04L 12/16* (2013.01); *H04L 12/56* (2013.01); *H04L 47/14* (2013.01);
(Continued)

(58) Field of Classification Search
CPC .............. H04W 28/24; H04W 28/0268; H04W 28/0967; H04W 28/0236; H04W 28/0273; H04W 28/0278; H04W 28/10; H04W 28/0215; H04W 28/0252; H04W 28/06; H04W 28/08; H04W 28/0958; H04W 28/0975; H04W 28/0983; H04W 28/18;
(Continued)

(56) References Cited

U.S. PATENT DOCUMENTS 8,437,808 B2  5/2013  Kashikar et al.
9,615,260 B2  4/2017  Rashid et al.
(Continued)

FOREIGN PATENT DOCUMENTS

WO   WO-2018031085 A1 * 2/2018 ............ H04W 80/02

*Primary Examiner* — Joshua Kading
(74) *Attorney, Agent, or Firm* — Kowert, Hood, Munyon, Rankin & Goetzel, P.C.

(57) ABSTRACT

Techniques and devices for service-specific tagging of data by an application processor (AP) of a user equipment device (UE). A first indication may be sent from the UE to a baseband processor (BB) of the UE of one or more quality of service preferences for an upcoming data session, and the BB may configure one or more layers of the BB according to the quality of service preferences. The BB may further communicate with a network to establish protocols for the quality of service preferences. The BB may determine one or more network conditions, and may transmit feedback from the BB to the AP related to the determined network conditions. In response, the AP may send a second indication of one or more updated quality of service preferences to the BB based at least in part on the feedback received from the BB.

20 Claims, 25 Drawing Sheets

(51) Int. Cl.

| | |
|---|---|
| *H04W 28/08* | (2009.01) |
| *H04W 28/02* | (2009.01) |
| *H04L 12/801* | (2013.01) |
| *H04W 24/02* | (2009.01) |
| *G06F 15/163* | (2006.01) |
| *H04L 12/70* | (2013.01) |
| *H04W 76/11* | (2018.01) |
| *H04W 76/27* | (2018.01) |
| *H04W 28/10* | (2009.01) |
| *H04W 72/12* | (2009.01) |
| *H04W 72/04* | (2009.01) |
| *H04L 12/16* | (2006.01) |
| *H04L 12/54* | (2013.01) |
| *H04W 48/16* | (2009.01) |
| *H04W 80/12* | (2009.01) |

(52) U.S. Cl.
CPC ............ *H04L 47/19* (2013.01); *H04W 24/02* (2013.01); *H04W 28/0215* (2013.01); *H04W 28/0236* (2013.01); *H04W 28/0252* (2013.01); *H04W 28/0268* (2013.01); *H04W 28/0273* (2013.01); *H04W 28/0278* (2013.01); *H04W 28/0967* (2020.05); *H04W 28/10* (2013.01); *H04W 72/048* (2013.01); *H04W 72/085* (2013.01); *H04W 72/1268* (2013.01); *H04W 76/11* (2018.02); *H04W 76/27* (2018.02); *G06F 15/163* (2013.01); *H04L 2012/5631* (2013.01); *H04L 2012/5638* (2013.01); *H04W 48/16* (2013.01); *H04W 80/12* (2013.01)

(58) Field of Classification Search
CPC ... H04W 24/02; H04W 4/70; H04W 72/1268; H04W 72/048; H04W 72/085; H04W 72/493; H04W 72/1257; H04W 76/10; H04W 76/11; H04W 76/27; H04W 80/12; H04W 48/16; H04W 48/18; H04L 12/16; H04L 12/56; H04L 47/10; H04L 47/14; H04L 47/19; H04L 2012/5638; H04L 2012/5631; H04L 67/14; H04L 67/141; H04L 67/322; G06F 15/163
See application file for complete search history.

(56) References Cited

U.S. PATENT DOCUMENTS

| | | | |
|---|---|---|---|
| 2002/0131388 A1* | 9/2002 | Ami | H04L 29/12009 370/338 |
| 2007/0105548 A1* | 5/2007 | Mohan | H04W 84/02 455/426.1 |
| 2014/0146763 A1* | 5/2014 | Khay-Ibbat | H04W 28/0268 370/329 |
| 2014/0348044 A1* | 11/2014 | Narayanan | H04L 65/1016 370/310 |
| 2018/0279168 A1* | 9/2018 | Jheng | H04W 28/04 |
| 2018/0324631 A1* | 11/2018 | Jheng | H04W 36/0022 |
| 2020/0037190 A1* | 1/2020 | Wu | H04W 28/0278 |
| 2020/0107386 A1* | 4/2020 | Van Phan | H04W 28/0215 |
| 2020/0137673 A1 | 4/2020 | Shikari et al. | |
| 2020/0305032 A1* | 9/2020 | Kuppelur | H04W 36/0022 |

* cited by examiner

| Service Tags | Applications Benefited | Enable DC and/or CA | Duplication | Prioritization | Early/ Conditional Handovers | Power Savers (Delayed Handovers) | Enable Compression | RRC Inactive State |
|---|---|---|---|---|---|---|---|---|
| Ultra-Reliable Service (with Multi-Path Diversity) | | ✓ | | ✓ | ✓ | | | ✓ |
| Ultra-Reliable Service (without Multi-Path Diversity) | | ✓ | ✓ | ✓ | ✓ | | | ✓ |
| Ultra-Low Latency Service (without Multi-Path Diversity) | | ✓ | | ✓ | ✓ | | ✓ | ✓ |
| High-Throughput Preferred Service | | ✓ | | | | | | |
| Best-Effort Service | | | | | | ✓ | | |

*FIG. 10*

| Per Data Packet Tags | Applications Benefited |
|---|---|
| Multipath Data with Sub-Flow Indication | Personal Assistant |
| Ultra-Reliable Data | ♡ 📷 📶 Personal Assistant |
| Ultra-Low Latency Data | AR 🚫 Personal Assistant 🔊 |

FIG. 15

METHODS FOR TRANSMITTING AND RECEIVING DATA IN 5G NR DEVICE BASED ON DATA/SERVICE TAGGING FROM APPLICATION PROCESSOR

PRIORITY CLAIM

This application claims priority to U.S. Provisional Patent Application No. 62/752,900, titled "Methods for Transmitting and Receiving Data in 5G NR Device Based on Data/Service Tagging from Application Processor" and filed on Oct. 30, 2018, which is hereby incorporated by reference in its entirety, as though fully and completely set forth herein.

FIELD

The present application relates to wireless devices, including to apparatuses, systems and methods for using data and/or service tagging from an application processor to transmit and receive data.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics and may use cellular connections in different ways. When multiple applications are active, it may be the case that those applications' networking activities are not coordinated with each other. This can lead to an unnecessarily large number of connections being created and inefficient use of those connections, which can have negative power use and/or performance implications. Accordingly, improvements in the field would be desirable.

SUMMARY

Embodiments are presented herein of apparatuses, systems, and methods for using data and/or service tagging from an application processor to transmit and receive data. Data from multiple applications may thus be separately treated with customized quality of service protocols depending on the nature of the data associated with each application.

In some embodiments, service-specific tagging of data is performed by an application processor (AP) of a user equipment device (UE). A first indication may be sent from the UE to a baseband processor (BB) of the UE of one or more quality of service preferences for an upcoming data session, and the BB may configure one or more layers of the BB according to the quality of service preferences. The BB may further communicate with a network to establish protocols for the quality of service preferences.

The BB may determine one or more network conditions, and may transmit feedback from the BB to the AP related to the determined network conditions. In response, the AP may send a second indication of one or more updated quality of service preferences to the BB based at least in part on the feedback received from the BB.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIG. 10 is a table illustrating different service tags that may be employed to indicate different specific quality of service preferences, according to some embodiments;

FIG. 15 is a table illustrating three different examples of per data packet tags, and example application types that may utilize each of the per data packet tags, according to some embodiments;

Figure 1:
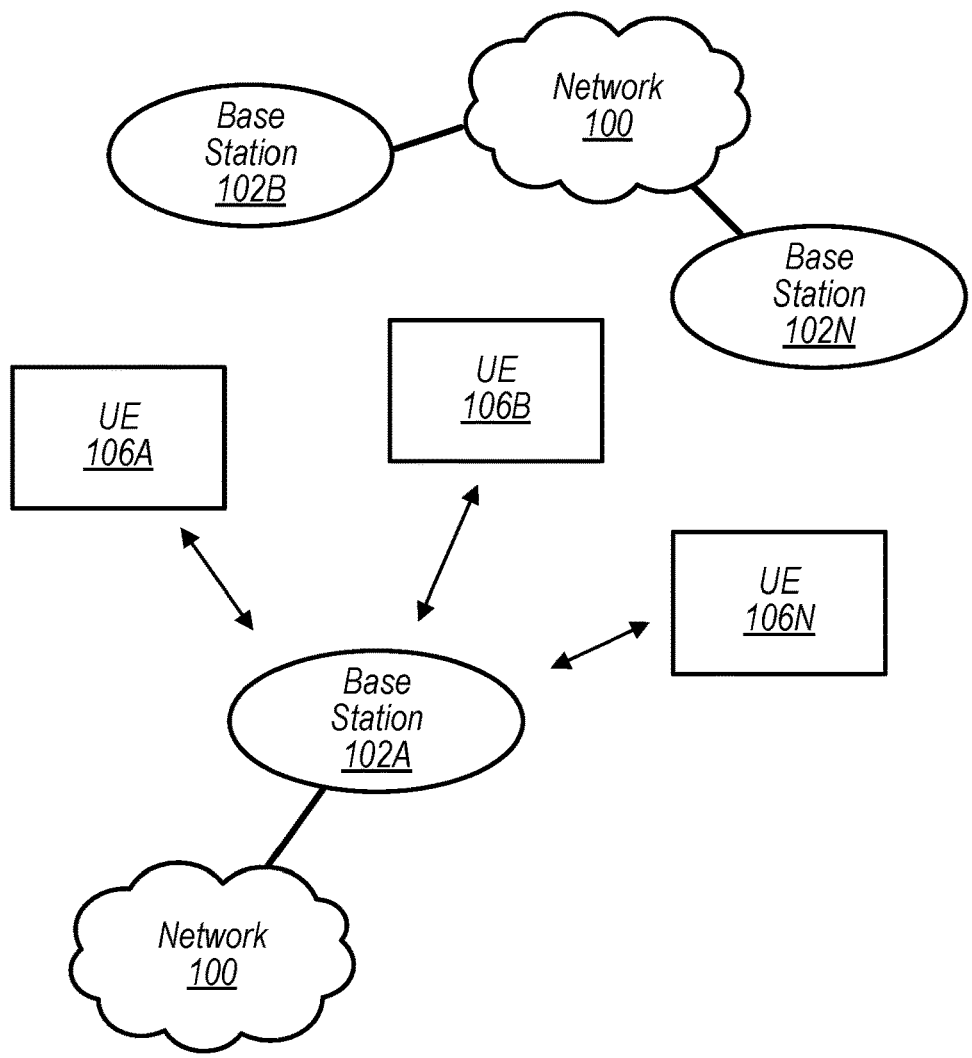
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EN-DC: Evolved Universal Terrestrial Radio Access New Radio Dual Connectivity
EPC: Evolved Packet Core
EPS: Evolved Packet Service
MME: Mobility Management Entity
5GC: 5G Core
AMF: Access and Mobility Management Function
SMF: Session Management Function
UPF: User Plane Function
HSS: Home Subscriber Server
RRC: Radio Resource Control
RLC: Radio Link Control
MAC: Media Access Control
PHY layer: Physical layer

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
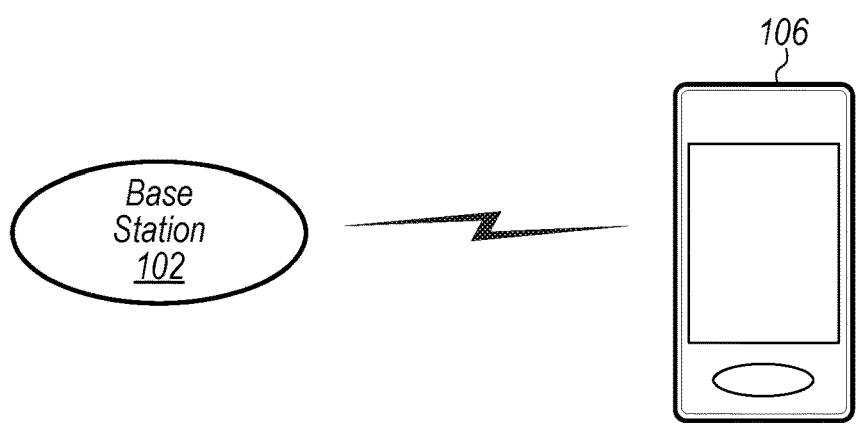
FIG. 2 illustrates a base station (BS) in communication with a user equipment (UE) device, according to some embodiments.
Figure 3:
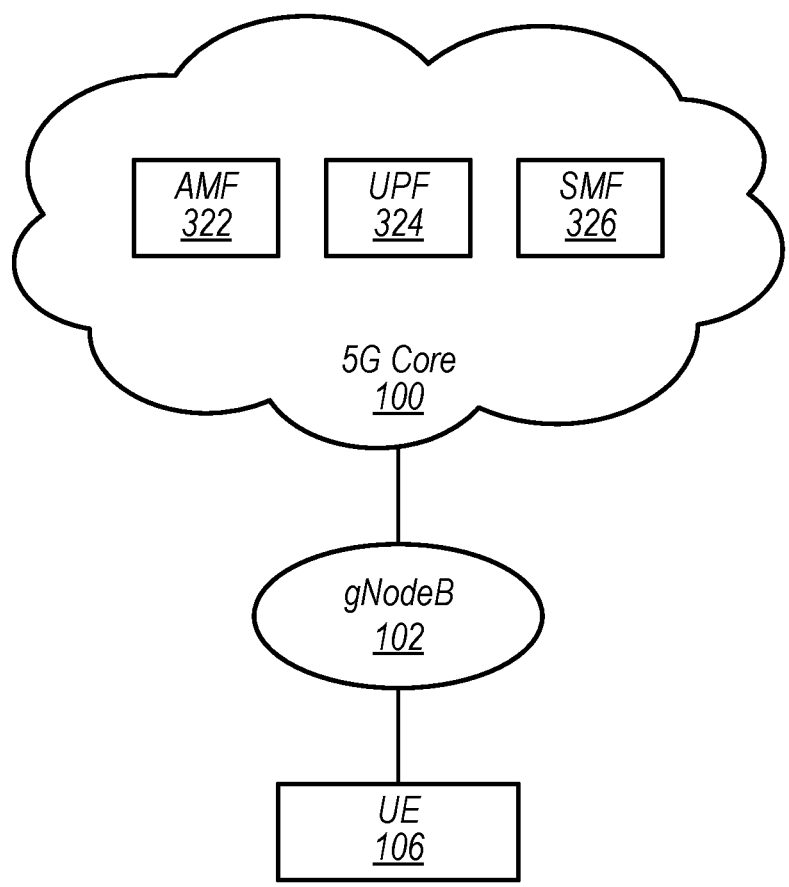
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, 5G NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of 5G New Radio (NR), CDMA2000 (1×RTT/1×EV-DO/HRPD/eH-RPD) or LTE using a single shared radio and/or multiple radios. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

A UE 106 and a base station 102 may establish a wireless link. The wireless link may be a cellular link. The cellular link may be established according to any of various possible cellular communication technologies. Establishing the cellular link may include camping on a cell provided by the BS 102 in an idle mode, an inactive mode, and/or may include operating in a connected mode. For example, according to certain cellular communication technologies the UE 106 may operate in either of a radio resource control (RRC) idle state, an RRC inactive state, or an RRC connected state with respect to the wireless link at any given time. The wireless link may transition between such idle-, inactive- and connected-states any number of times, e.g., according to link conditions, data queued to be exchanged, and/or any of various other considerations.

The wireless link may be established with the BS 102 by a baseband processor (BB) (e.g., in conjunction with associated radio/wireless communication circuitry) of the UE 106. The baseband processor may monitor and manage the wireless link between the UE 106 and the BS 102, which may include performing cell searches, cell measurements, cell selection, setting up and tearing down connected mode, transmitting and receiving data over the wireless link, and/or any of various other baseband operations.

The UE 106 may also include an application processor (AP). The application processor may support user applications, including providing an operating environment for such applications (e.g., potentially including any or all of graphics processing, memory management, network interface capability with the baseband processor, and/or any of various other functions) and executing the applications themselves.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an gNodeB 102. In turn, the gNodeB may be coupled to a core network, shown in this exemplary embodiment as a 5G core (5GC) 100. As shown, the 5GC 100 may include an access and mobility management function (AMF) 322, a user plane function (UPF) 324, and a session management function (SMF) 326. The 5GC 100 may include various other devices and/or entities known to those skilled in the art as well.

Figure 4:
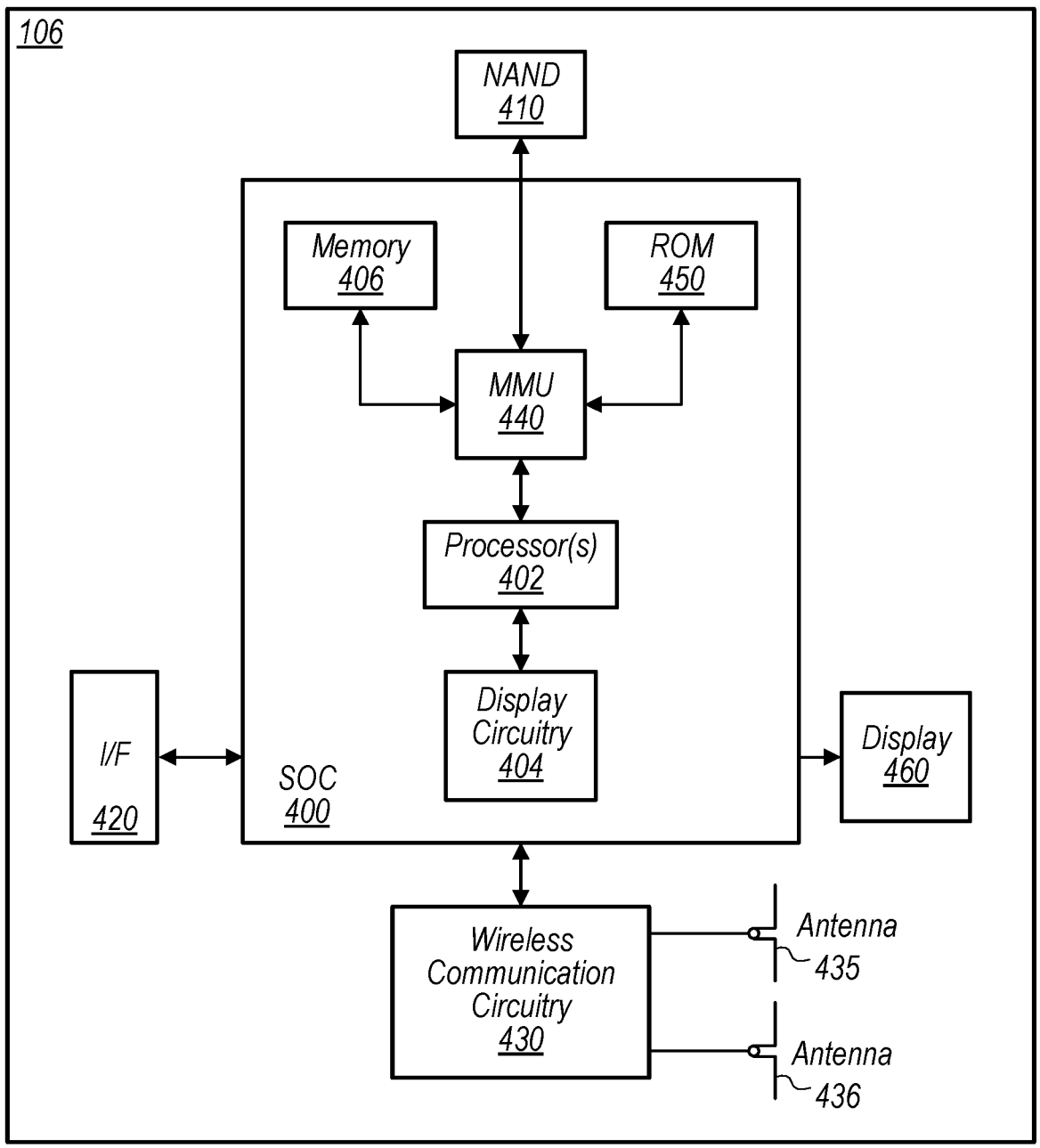
FIG. 4 illustrates an exemplary block diagram of a user equipment device (UE), according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for 5G NR, LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antennas 435 and 436 to perform the wireless communication, wherein the dual antennas are configured to separately communicate according to separate radio access technologies (e.g., antenna 435 may communicate using 5G NR, while antenna 436 may communicate using 3GPP LTE, among other possibilities)

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
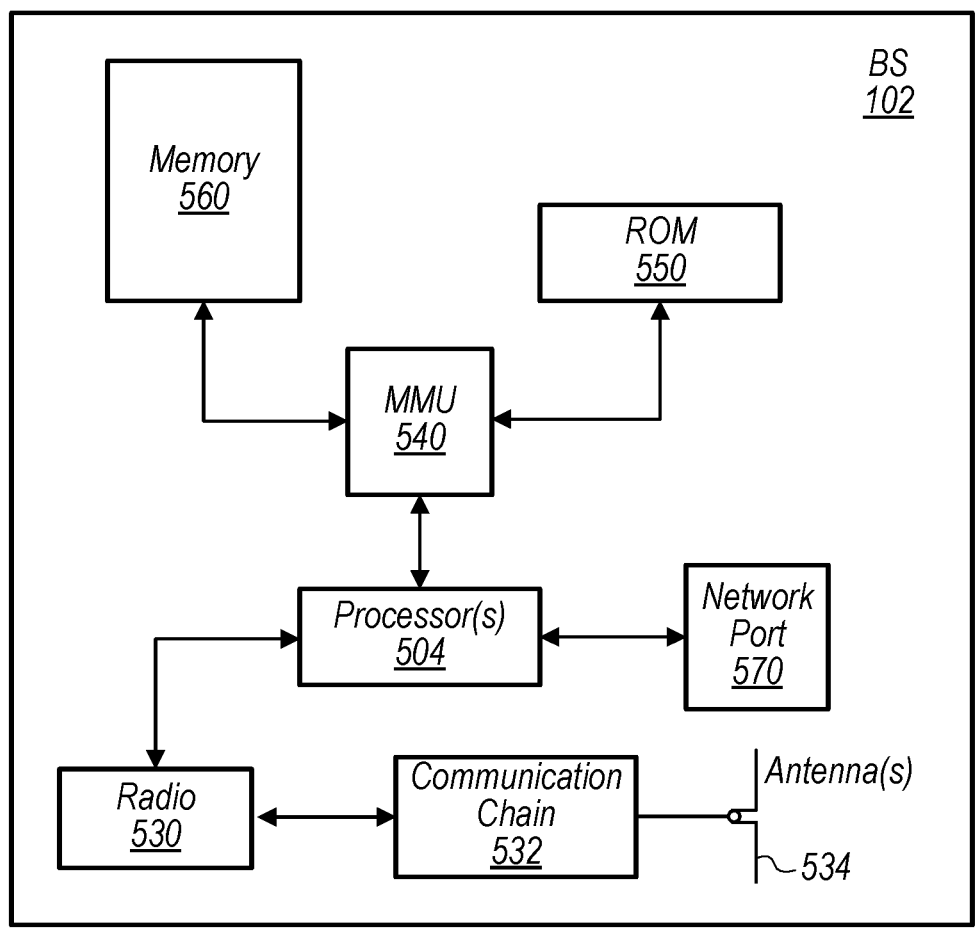
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, 5G NR, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

5G NR Data Service Tagging

Figure 6:
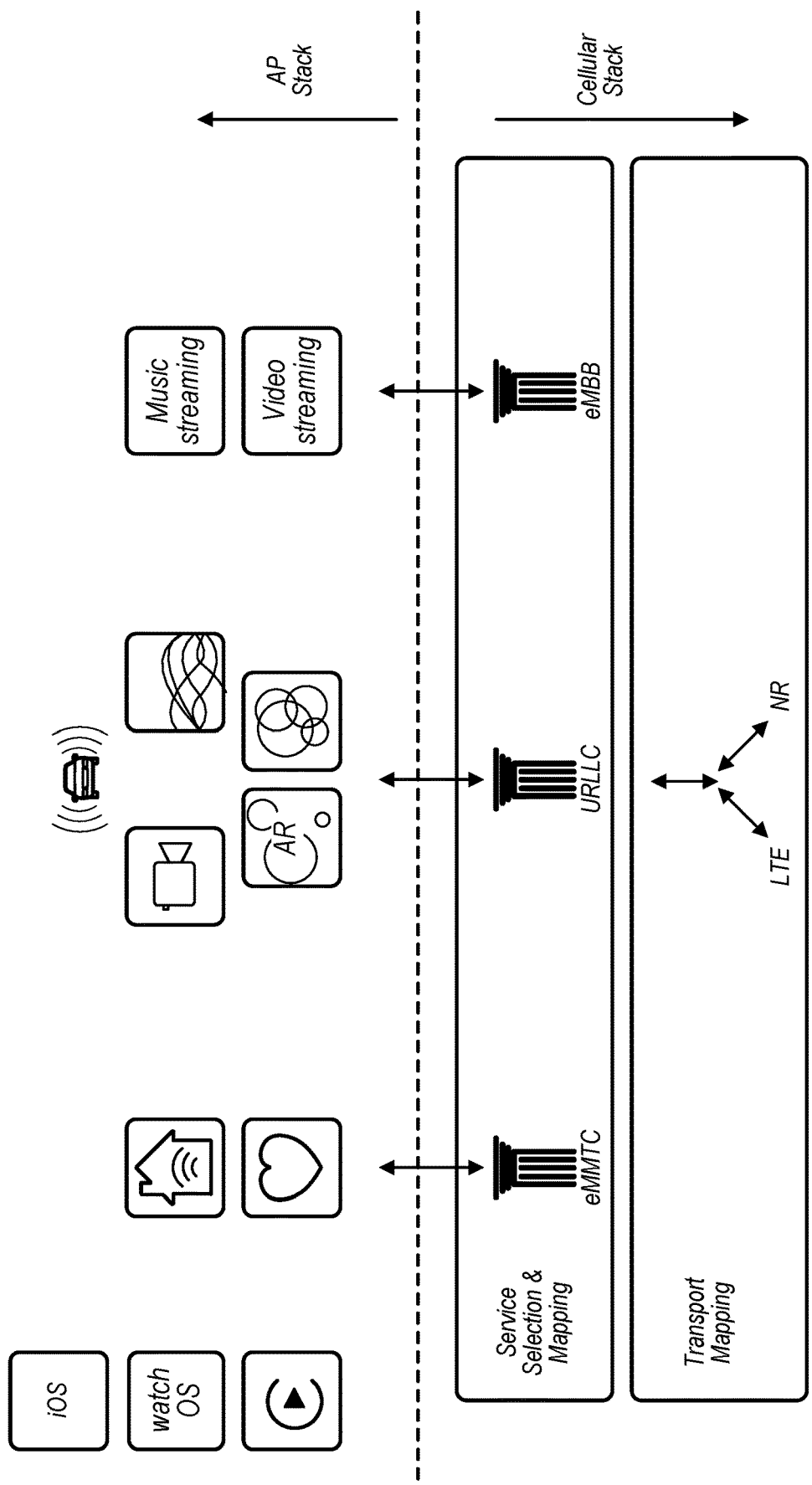
FIG. 6 is a table illustrating various types of applications that may typically be associated with each of various service types, according to some embodiments.

It is anticipated that 5G New Radio (NR) will accommodate multiple types of data traffic, each with distinct radio resource requirements and service preferences. For example, enhanced massive machine-type communications (EMMTC), ultra-reliable low-latency communications (URLLC), and enhanced mobile broadband (eMBB) may each have distinct requirements and/or preferences for latency, reliability, throughput, security, energy consumption and/or other network qualities. FIG. 6 illustrates various types of applications (e.g., which may be operating on different types of devices such as UE devices, smart phones, wearables, or car infotainment systems, among other possibilities) that may typically be associated with each of these service types. For example, smart home devices and health monitors may utilize eMMTC, with low throughput requirements and low energy consumption preferences. Smart car communications, live video chat, virtual personal assistant applications (e.g., voice-activated assistant applications), and augmented reality applications may utilize URLLC, with strict low latency requirements to preserve a good user experience. Music and video streaming may utilize eMBB, with large throughput requirements. Additionally, FIG. 6 illustrates how NR-capable devices may employ transport mapping to operate a tight interworking dual connectivity (DC) mode utilizing both LTE and NR communications. To address the increased diversity of network requirements for NR communications, embodiments herein present methods and devices for efficiently accommodating diverse network environments and application data requirements.

Split Bearer Enabled UE and Base Stations

Figure 7:
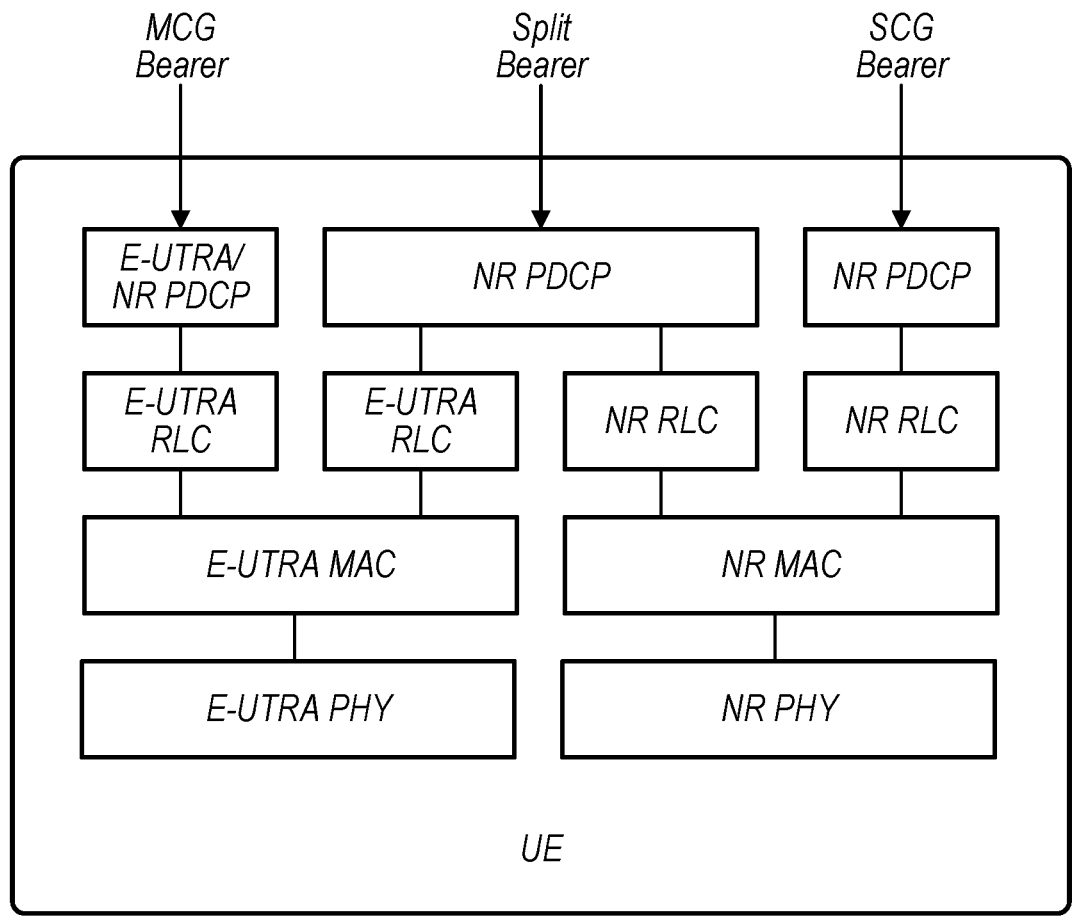
FIG. 7 illustrates a UE configured with multiple bearers to enable data aggregation on both long term evolution (LTE) and 5G New Radio (NR) communication technologies, according to some embodiments.
Figure 8:
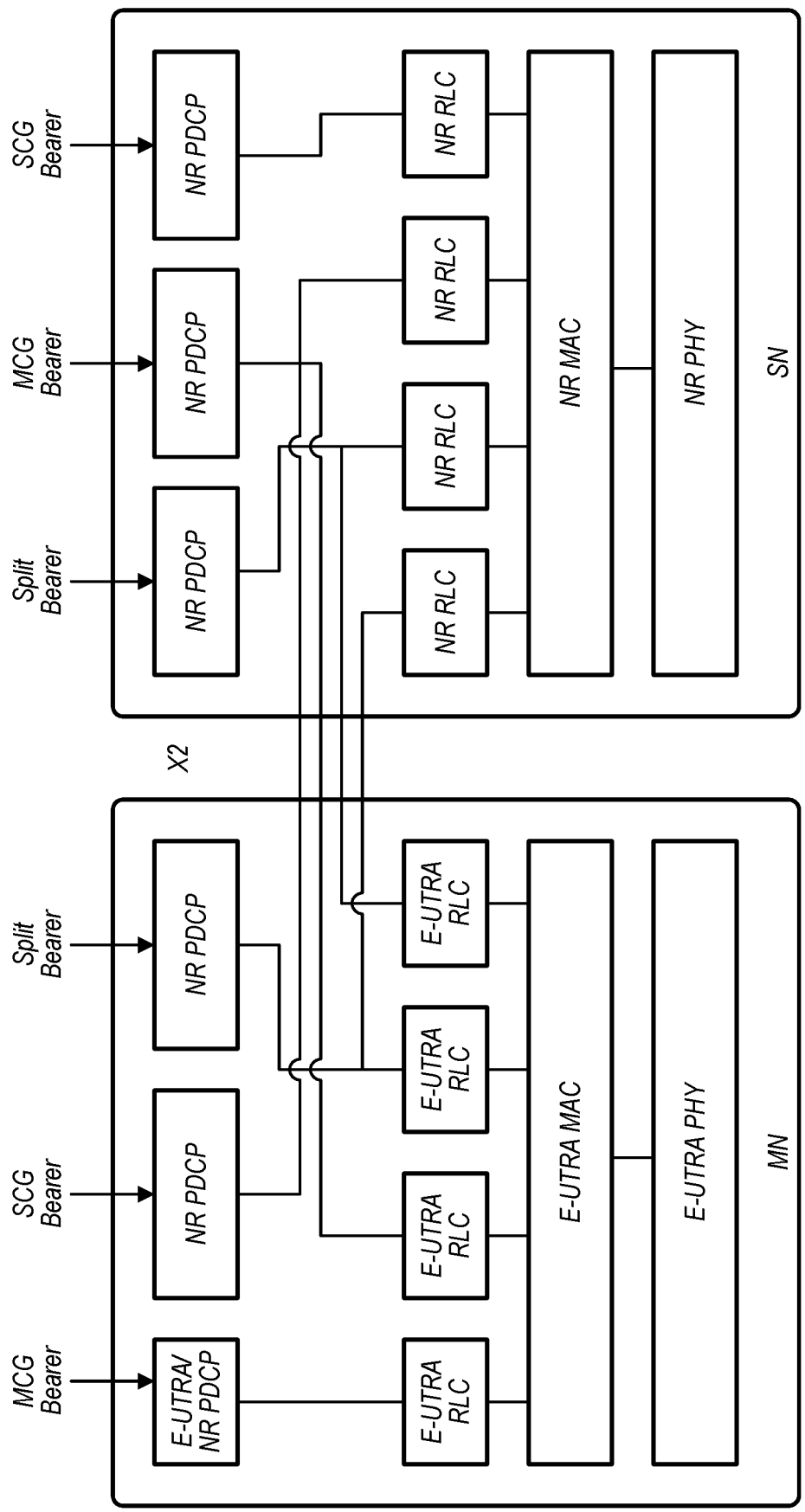
FIG. 8 illustrates a dual master node (MN) and secondary node (SN) base station system, wherein each of the MN and SN operate according to multiple radio bearers, according to some embodiments.

FIGS. 7 and 8 illustrate a UE and a base station system, respectively, that employ a split bearer to enable data aggregation on both LTE and NR communications according to a multi-RAT Evolved Universal Terrestrial Radio Access New Radio Dual Connectivity (EN-DC).

Specifically, FIG. 7 illustrates a UE enabled to implement link diversity at the NR packet data convergence protocol (PDCP) layer with a master cell group (MCG) radio bearer for communicating with either legacy Evolved Universal Mobile Telecommunications System (UMTS) Terrestrial Radio Access (E-UTRA) or NR packet data convergence protocols (PDCPs), a secondary cell group (SCG) radio bearer for communicating with an NR PDCP, and a split radio bearer that is split between both protocols to perform data aggregation and/or reordering inside the NR PDCP. Notably, the exemplary UE illustrated in FIG. 7 employs a multiple PDCP instances and multiple RLC, MAC, and/or PHY entities.

FIG. 8 illustrates a dual master node (MN) and secondary node (SN) base station system, wherein each of the MN and SN operate according to an MCG bearer, an SCG bearer, and a split bearer, in additional to cross communicating between the MN and SN.

Figure 9:
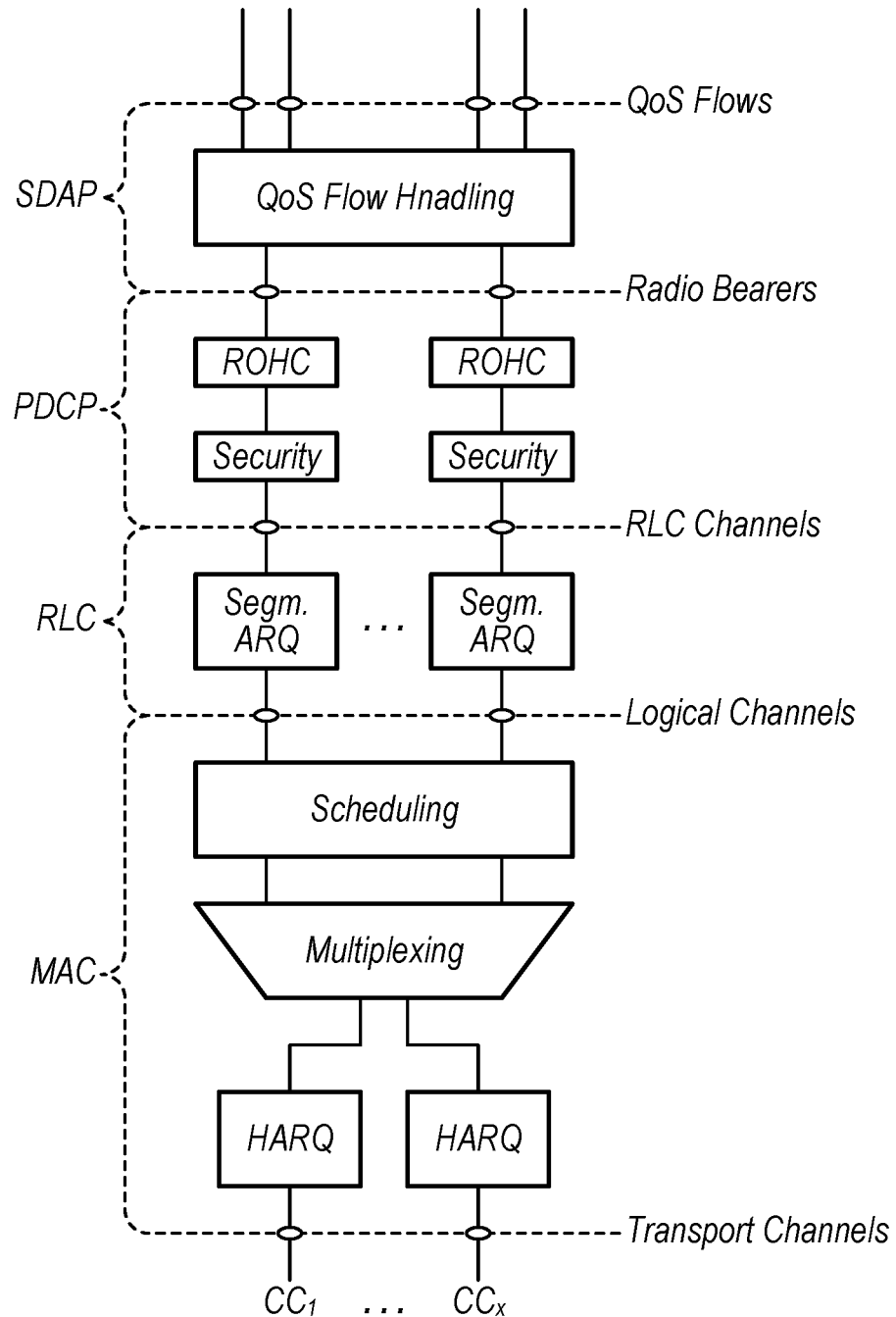
FIG. 9 illustrates a protocol stack for implementing stand-alone (SA) 5G NR uplink carrier aggregation (UL CA), according to some embodiments.

FIG. 9 illustrates a protocol stack for implementing standalone (SA) 5G NR uplink carrier aggregation (UL CA). As illustrated, link diversity may be implemented at the MAC Layer, and a single RLC, a single PDCP entity, and multiple MAC and PHY entities may be utilized with one master. In some embodiments, the MAC layer may split RLC data packet data units (PDUs) to go over individual PHY links.

5G NR EN-DC

It is anticipated that the initial 5G NR rollout may be based on EN-DC with an evolved packet core (EPC), where LTE and NR links may be tightly coupled and both links are aggregated to increase throughput. In this case, a single NR PDCP entity may be associated with a LTE RLC entity and a NR RLC entity. In some embodiments, LTE may be employed as the core network, with NR implemented as a supplemental RAT. While the two links may be aggregated with the intent to increase capacity, they may also be exploited to utilize the diversity of the over-the-air link. Additionally or alternatively, standalone 5G (and LTE) deployments may also offer link diversity by utilizing carrier aggregation concepts. While LTE/NR dual connectivity implements a top down approach that effects all protocol layers, carrier aggregation may only affect the MAC and lower layers of the protocol stack.

In some embodiments, the cellular baseband processor (BB) may be enabled to exploit the 5G features if the application processor (AP) tags data (e.g., uplink data) appropriately. Additionally or alternatively, the BB may assist the AP by providing valuable feedback as discussed in further detail below. In exemplary embodiments, UE devices, smart watches, smart TVs, smart cars, and other types of devices with a 5G modem may enjoy advantages when the operating system provides data/service tagging to improve and integrate the services of 5G NR modem technology.

Service and Per Data Packet Tagging

FIG. 10 is a table illustrating different service tags that may be employed to indicate different specific quality of service preferences for an upcoming data session.

In some embodiments, the Application Processor (AP) core networking layer of a UE device may expose application program interfaces (APIs) for first party and trusted third-party applications, to request certain service requirements while the UE device is on a cellular connection. The AP may inform the baseband when some process and/or application, needing certain types of network services (such that those can be mapped onto 5G verticals), are initiated and/or terminated. In response, the BB may attempt to match those service requirement preferences and adjust its operations as described in greater detail below.

As illustrated in FIG. 10, different service tags may indicate a desirability of implementing one or more of dual connectivity and/or carrier aggregation, data duplication, prioritization, early and/or conditional handovers, power saving mechanisms (e.g., delayed handovers), compression enablement, and utilization of an RRC inactive state. The BB may implement (or attempt to implement) the indicated features based on a service type indication received from the AP. In some embodiments, a framework may be created according to the table illustrated in FIG. 10, or according to a comparable or similar table, to control 5G optimization based on a data and/or service type indicated to the BB by the AP.

In some embodiments, more than one service type may be enabled by the AP in parallel. For instance, if a virtual personal assistant is being used to search and play a song on a UE (e.g., indicating parallel usage of an ultra-reliable service, the virtual personal assistant, and a high-throughput preferred service, the music streaming), the AP may indicate to the BB to provide reliable, low latency and high throughput service.

Figure 11A:
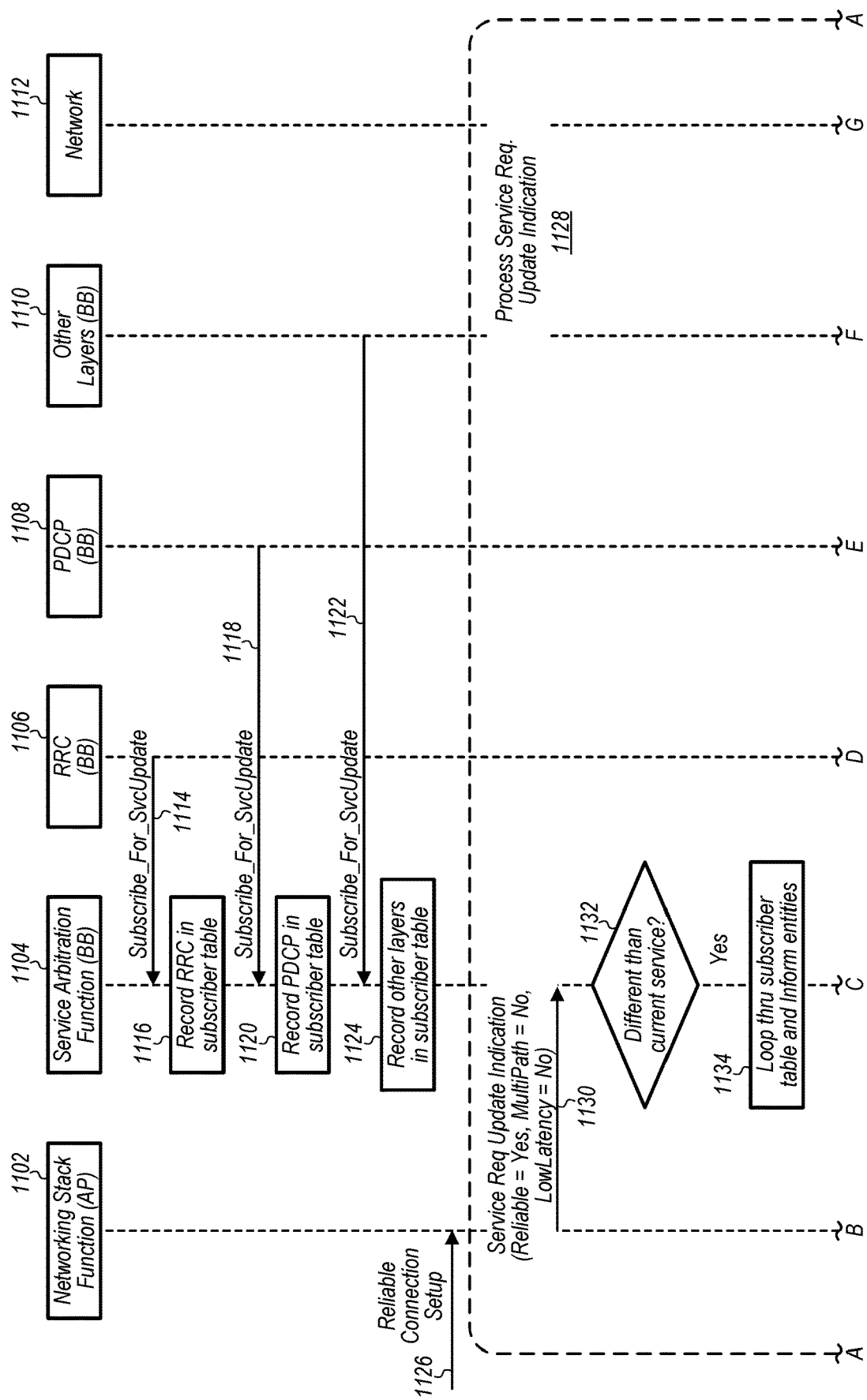
FIGS. 11A-C are a communication flow diagram illustrating a method to implement service tagging communications between the application processor (AP) and the baseband (BB), according to some embodiments.
Figure 11B:
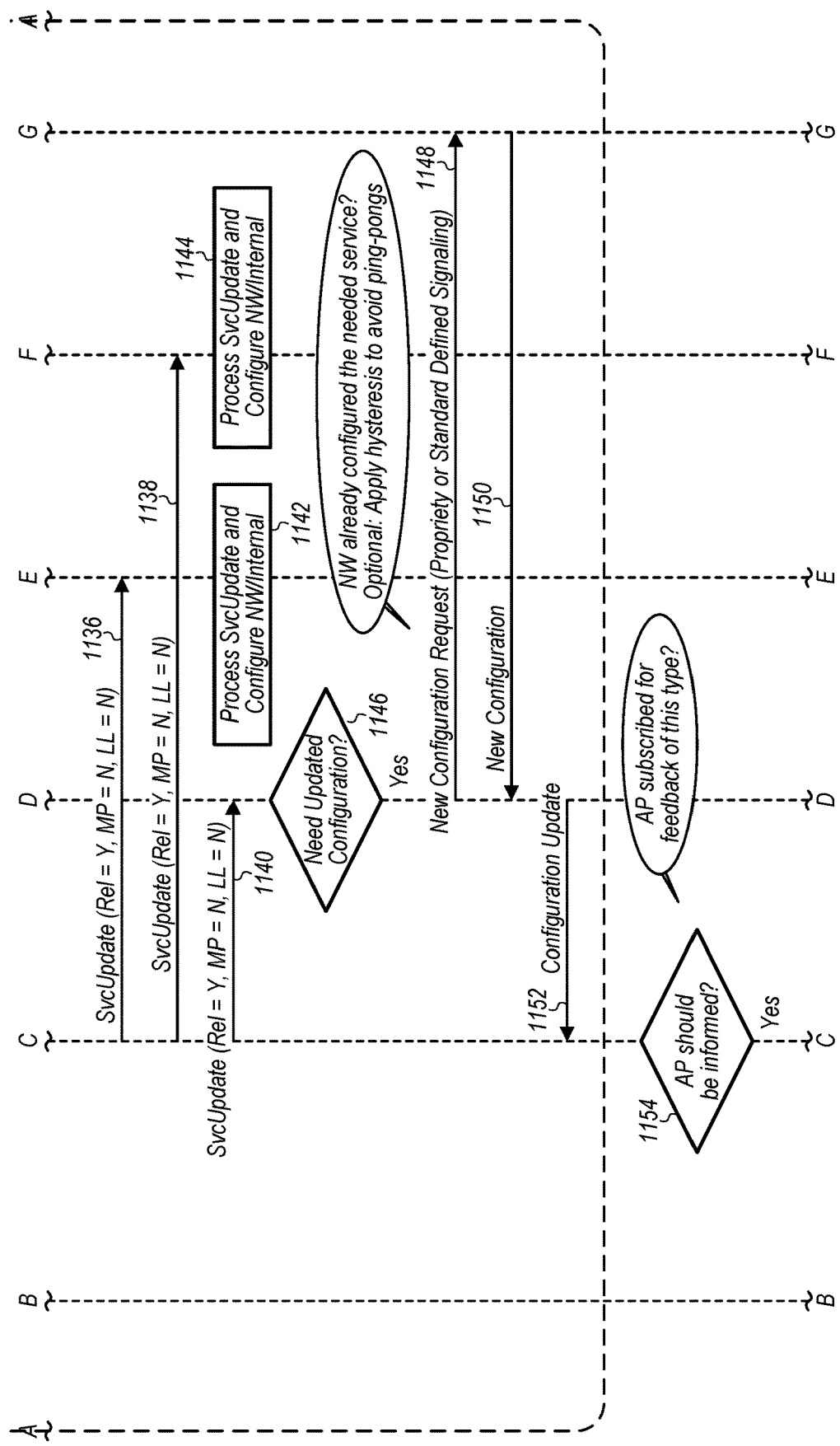
Figure 11C:
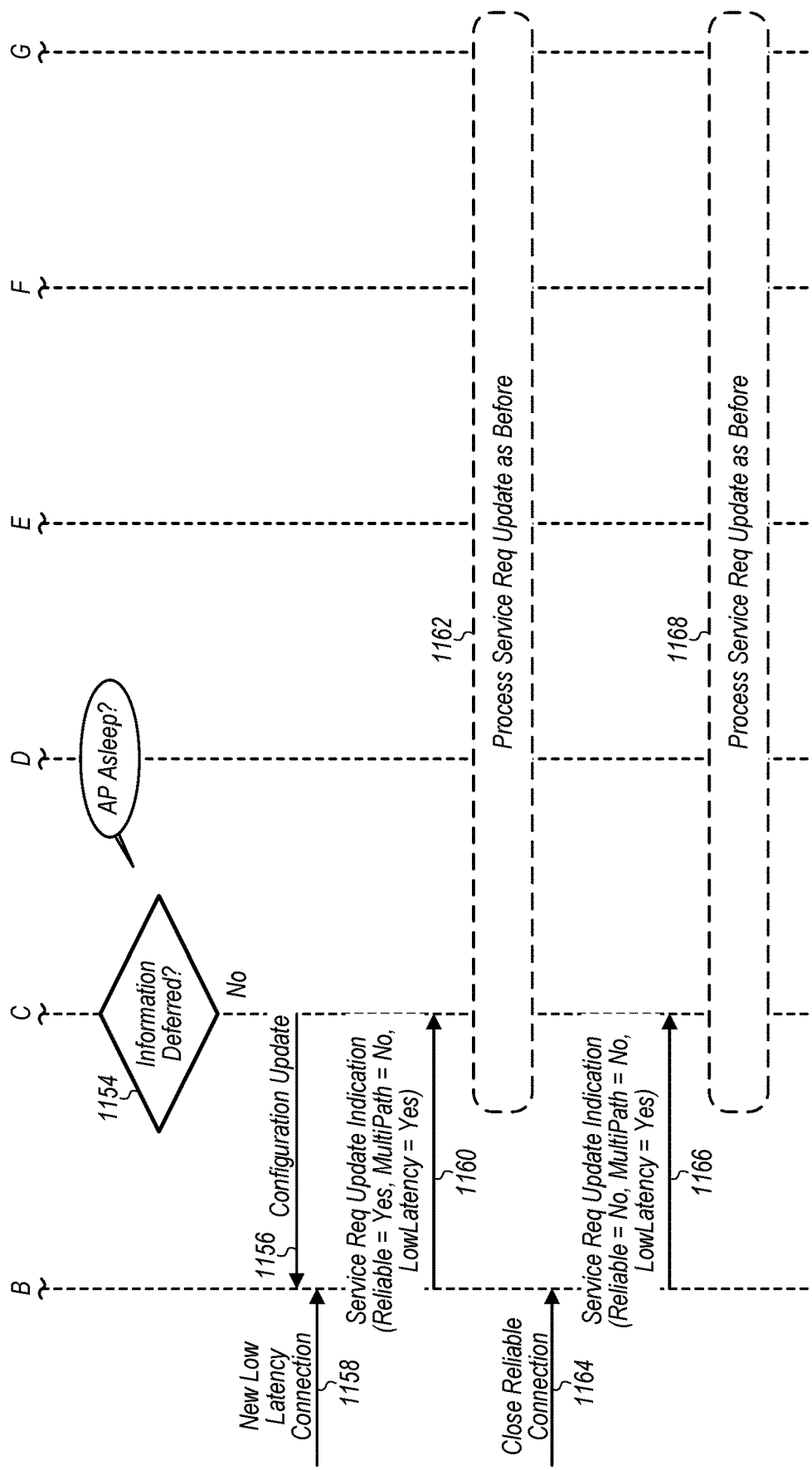

FIGS. 11A-C—Service Tagging Communication Framework

FIGS. 11A-C are a communication flow diagram illustrating a method to implement service tagging communications between the AP and the BB. As illustrated, the RRC layer 1106, the PDCP layer 1108, and/or other layers of the BB 1110 may each subscribe with the service arbitration function (SAF) 1104 of the BB to receive service updates at steps 1114, 1118, and 1122. In response, the SAF may record each of the BB entities which subscribed to receive service updates in a subscriber table at steps 1116, 1120, and 1124.

As illustrated, the networking stack function (NSF) 1102 of the AP may receive instruction to set up a reliable connection at 1126, and may initiate a procedure to process a service request update indication as delineated by the dotted box at step 1128. The NSF may send an indication to the SAF at 1130 indicating one or more quality of service (QOS) preferences for the connection. For example, there may be one or more fields indicating a preference to implement reliability enhancements, multipath communications, and/or low latency, among other possibilities. In the illustrated example of FIGS. 11A-C, the QOS preferences indicate a preference for enhanced reliability. At 1132, the SAF may determine whether the received QOS preferences differ from the QOS preferences currently implemented (e.g., the QOS preferences used in a previous communication). If the QOS preferences differ, at 1134 the SAF may loop through the subscriber table to inform the BB entities at steps 1136, 1138 and/or 1140 (i.e., the separate layers of the BB) of the updated QOS preferences. In response, the BB entities may process the service update at steps 1142, 1144, and/or 1146 and configure with the network and/or internally according to the updated QOS preferences. In other words, each of one or more layers of the BB may configure itself according to the quality of service preference. If the update requires an updated configuration from the network side, the BB entity may transmit a configuration request to the network at step 1148 and receive a new configuration from the network at step 1150 to implement the QOS requirement(s). The BB may then inform the SAF of the configuration update at 1152.

At 1154, if the BB determines that the AP has previously subscribed to receive feedback regarding the configuration update from the BB, the BB may transmit feedback 1156 to the AP informing the AP of the configuration update. Additionally, as described in greater detail below, the feedback may comprise network quality information or other types of feedback information. In some embodiments, if the AP is asleep, the BB may defer transmitting configuration update feedback to avoid the excess energy expenditure of waking the AP to receive the feedback, and the BB may transmit the feedback after the AP has awoken from the sleep state.

At 1158, the networking stack function of the AP receives instructions to establish a low latency connection (in addition to the ongoing enhanced reliability connection), and sends an indication 1160 to the SAF indicating a preference for an enhanced reliability and low latency QOS requirement. The process service request update may subsequently proceed at step 1162 as before (i.e., it may proceed similarly to as described within the dotted box delineated by step 1128).

At 1164, the networking stack function of the AP receives instructions to close the previously established reliable connection, and sends an indication 1166 to the SAF indicating a preference for a low latency QOS requirement but without a preference for an enhanced reliability QOS requirement. Again, the BB may process the service requirement update at step 1168 as before (i.e., it may proceed similarly to as described within the dotted box delineated by step 1128) to remove the enhanced reliability protocols, thus preserving energy and network resources.

According to the specific QOS preferences, the BB may implement the QOS in a various of ways. In other words, each of the configuration of one or more layers of the BB according to the QOS preference and the communication with the network to establish protocols for the QOS preference may be accomplished in a variety of different ways depending on the QOS preference, according to various embodiments. In some embodiments, link bandwidth and link diversity may be utilized to enable dual connectivity (DC), carrier aggregation (CA), reduced latency, enhanced reliability, and/or higher throughput. In some embodiments, the BB may send a fake buffer status report (BSR) with a high buffer volume upon initiating a service tagged for enhanced reliability or high throughput by the AP, which may cause the network to enable DC or CA. The BB may exchange an NR PDCP control packet data unit (PDU) with the network to enable and disable DC and/or CA.

In some embodiments, data duplication may be introduced to enhance reliability. A MAC control element (CE) as defined in 3GPP (and possibly as generalized to NR) may be utilized to enable and disable data duplication. Advantageously, data duplication may be implemented autonomously by the UE without approval or configuration from the network.

In some embodiments, PDU session, radio bearer, and/or logical channel prioritization may be implemented to provide improved latency. This may supply the UE with the ability to increase priority of the logical channel associated with the bearer for which the modem may expect to receive low latency or high reliability data to transmit to the network.

In some embodiments, early conditional handovers for high mobility devices may be implemented for low latency and/or enhanced reliability services. It is anticipated that 5G NR may implement early and/or conditional handovers to reduce latency during high UE mobility. In these embodiments, measurement thresholds may be updated for neighbors to trigger early handovers, as late handovers may result in a higher probability of failure (e.g., a measurement report may not reach the network if the UE is already in a poor coverage area).

In some embodiments, for low latency and/or high reliability services, data compression may be implemented, which may increase robustness in congested or marginal cellular conditions. For example, it is anticipated that 5G NR may support UL-only robust header compression (RoHC), which may be implemented for low latency and/or high reliability services.

In some embodiments, for low latency services, a radio resource control (RRC) inactive state may be implemented. 3GPP Release 15 supports an RRC inactive State, whereby a UE implements some power savings without entirely disabling the RRC connection as in the RRC idle state. Additionally, future 3GPP releases may support data transfers in the RRC Inactive State. This may supply the UE with improved latency due to better connected mode discontinuous reception (CDRX) performance and reduced setup time to enter RRC connected state during periodic bursts of heavy traffic.

According to some embodiments, a wireless device may enter the connected mode (e.g., from the idle or the inactive mode mode) in a device-initiated manner by performing a random access procedure (RACH), among other possibilities, or in a network-initiated manner as a result of receiving a paging message from its serving cell. For example, the wireless device may RACH to transition to the connected mode in order to communicate delay sensitive data if the wireless device is not already in the connected mode. Similarly, if the network has data to communicate to the wireless device, the network may page the wireless device to cause a transition to connected mode, so that the network may then be able to communicate the data to the wireless device.

In some embodiments, the BB may indicate its preference to establish an RRC inactive state to the network. Hence, if the AP provides QOS information to the BB indicating a preference for low latency, it may be utilized by the BB to keep the UE in the RRC inactive state between bursts of back-to-back data requests (e.g, conversational virtual assistant queries or other low latency services).

In some embodiments, for best effort traffic, power saving protocols may be implemented by the BB. For example, mobility measurements may be reduced (e.g., performed less frequently), and DC and/or CA may be removed when only best effort traffic is indicated by the AP. Accordingly, a UE may intelligently balance power and performance requirements by enabling some power saving functionalities.

Figure 12A:
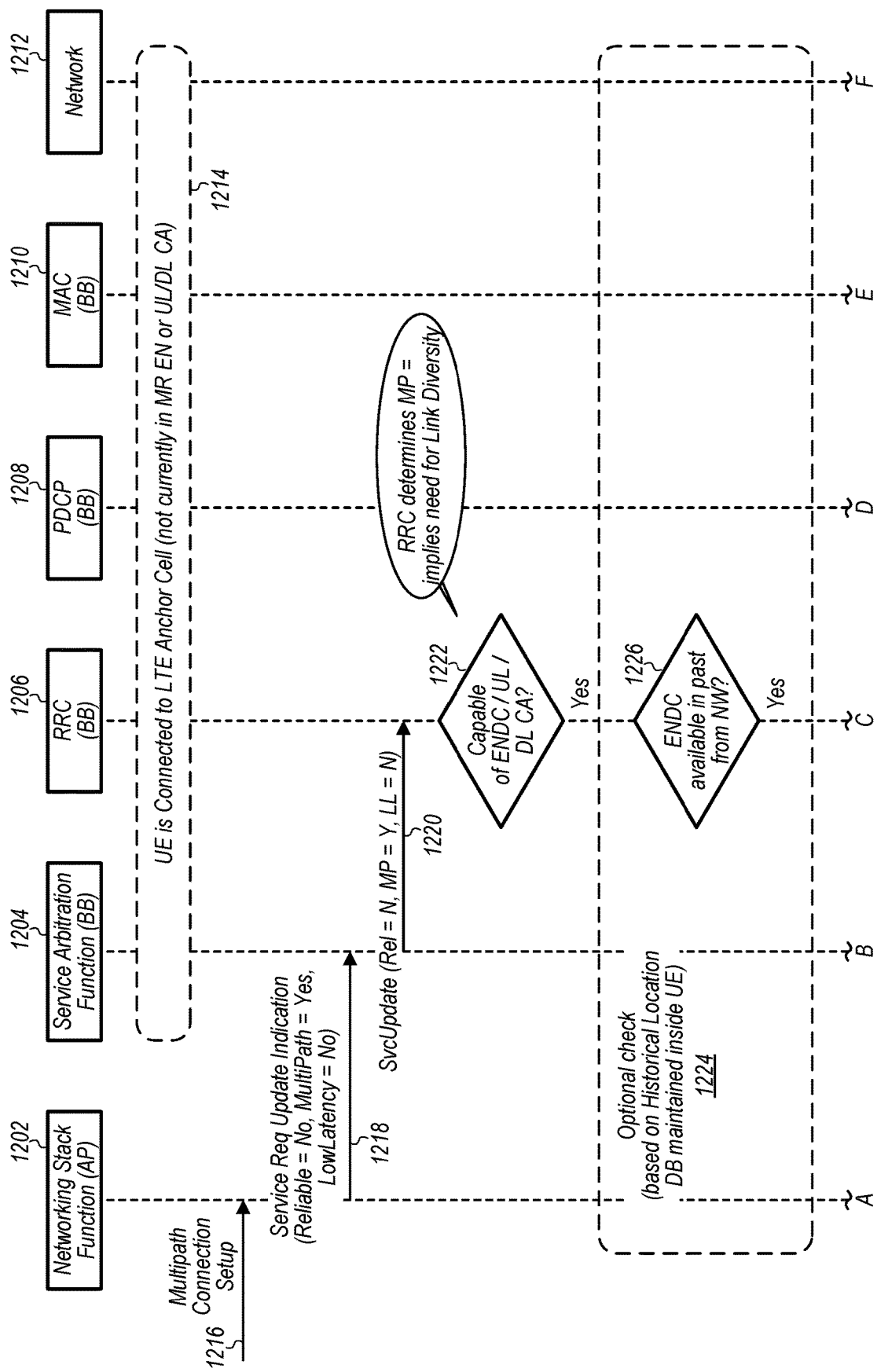
FIGS. 12A-C are a communication flow diagram illustrating a method to implement service tagging communications between the AP and the BB to enable link diversity, according to some embodiments.
Figure 12B:
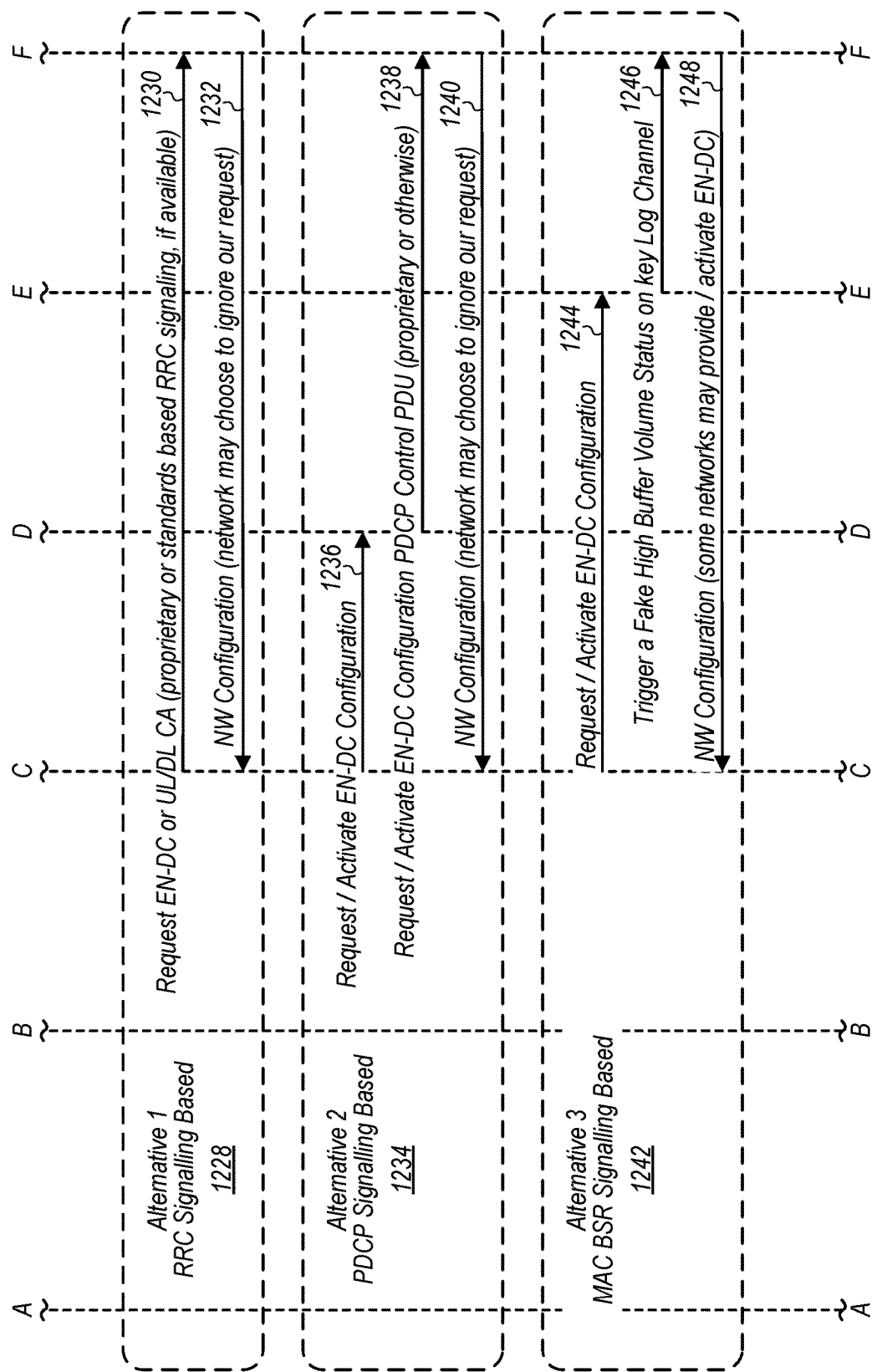
Figure 12C:
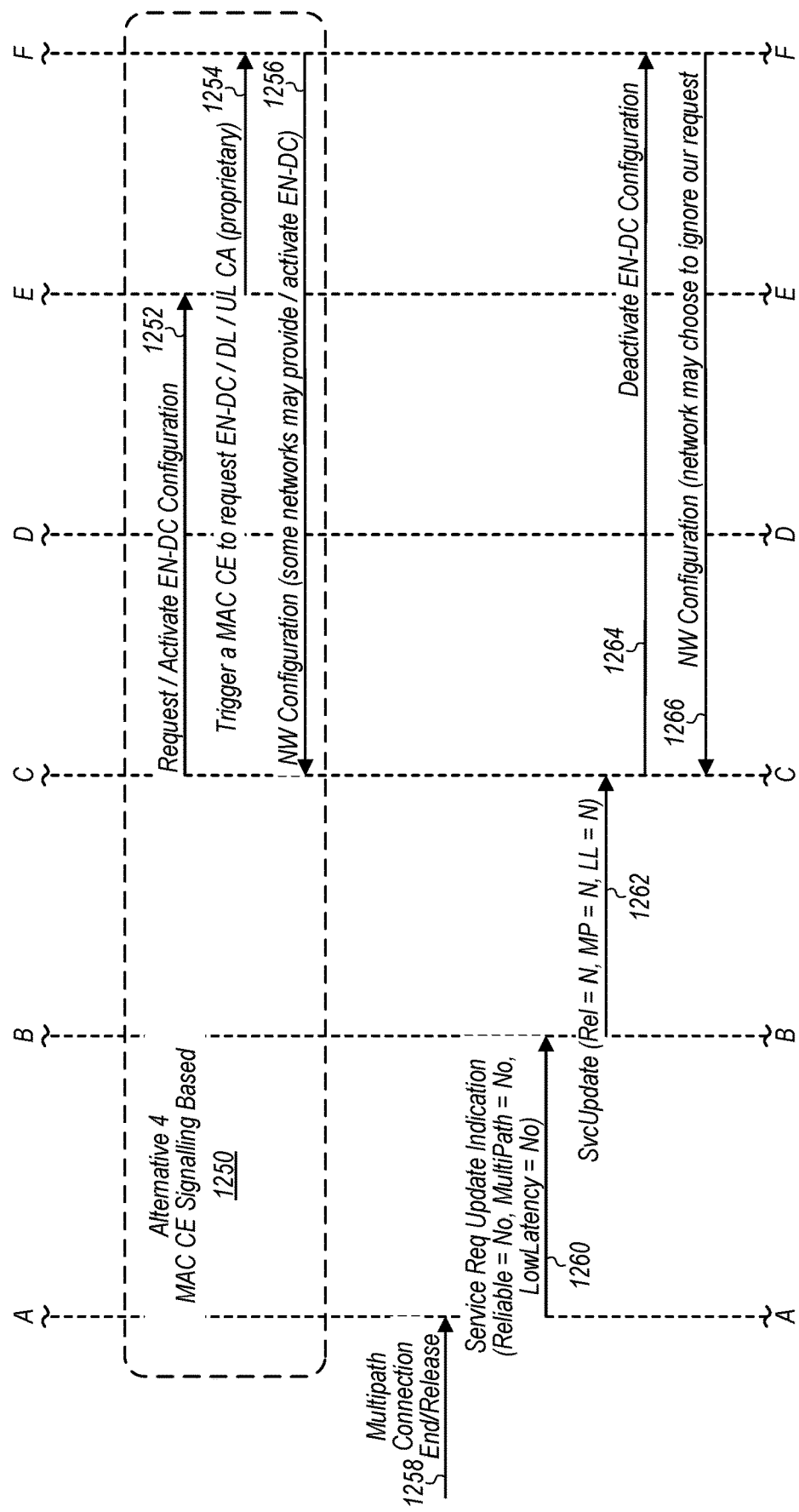

FIGS. 12A-C—Enable Link Diversity

FIGS. 12A-C are a communication flow diagram illustrating a method to implement service tagging communications between the AP and the BB to enable link diversity, according to some embodiments. According to various embodiments, link diversity may be implemented by utilizing a multipath connection through either EUTRAN-NR dual connectivity (EN-DC) or uplink/downlink carrier aggregation (UL/DL CA), according to various embodiments. Prior to initiating the method, the UE may be connected to an LTE anchor cell at step 1214, but may not have currently established a dual connectivity or carrier aggregated connection.

As illustrated, the networking stack function (NSF) 1202 of the AP may receive a request to set up a multipath connection at step 1216 for an upcoming data session. The AP may transmit a service request update indication at step 1218 to the service arbitration function (SAF) 1204 of the BB indicating a request for a multipath connection. The SAF may transmit a service update indicator at step 1220 to the radio resource control (RRC) layer 1206 of the BB indicating the preference for a multipath connection. In response, the RRC layer may determine that a multipath connection implies a need for link diversity, and the RRC may further determine whether the UE camped on a cell that is capable of EN-DC or UL/DL CA at step 1222. For example, the RRC layer may check a historical location database maintained inside the UE at step 1224 to determine whether EN-DC or UL/DL CA was previously available at step 1226 at the currently camped on cell. In some embodiments, the historical location database may have been crowd sourced by a plurality of other UEs and may have been downloaded by the UE from the cloud or another network source.

If it is determined by the RRC layer that EN-DC or UL/DL CA is available, one of four different alternative mechanisms may be employed to implement the multipath connection, as described in the dotted boxes enclosing steps 1228, 1234, 1242, and 1250. As a first alternative (Alternative 1, step 1228), the RRC layer may directly request an EN-DC or UL/DL CA connection from the network at step 1230 using proprietary or standards-based RRC signaling. The network may respond with a configuration message at step 1232, which may either grant or ignore the multipath request.

As a second alternative (Alternative 2, step 1234), the RRC layer may request at step 1236 that the PDCP layer of the BB transmits a request to activate an EN-DC configuration at step 1238, and the network may respond either granting or ignoring the request at step 1240.

As a third alternative (Alternative 3, step 1242), the RRC layer may request at 1244 that the MAC layer of the BB trigger a fake high buffer volume status on a key logical channel to the network at step 1246, which may cause the network to provide and/or activate an EN-DC connection at step 1248 to alleviate the perceived high buffer volume.

As a fourth alternative (Alternative 4, step 1250), the RRC layer may request at step 1252 that the MAC layer utilize proprietary signaling at step 1254 to trigger a MAC control element (CE) to request the EN-DC or UL/DL CA connection, which may be provided by the network at step 1256.

After establishing the multipath connection, once the multipath connection has ended at step 1258, the AP may inform the BB that the multipath connection has ended at step 1260, and the SAF of the BB may transmit an updated QOS preference message to the RRC layer of the BB at step 1262. The RRC layer may then deactivate the multipath connection at step 1264 (potentially after a hysteresis timer), which may be granted or ignored by the network at step 1266.

Figure 13:
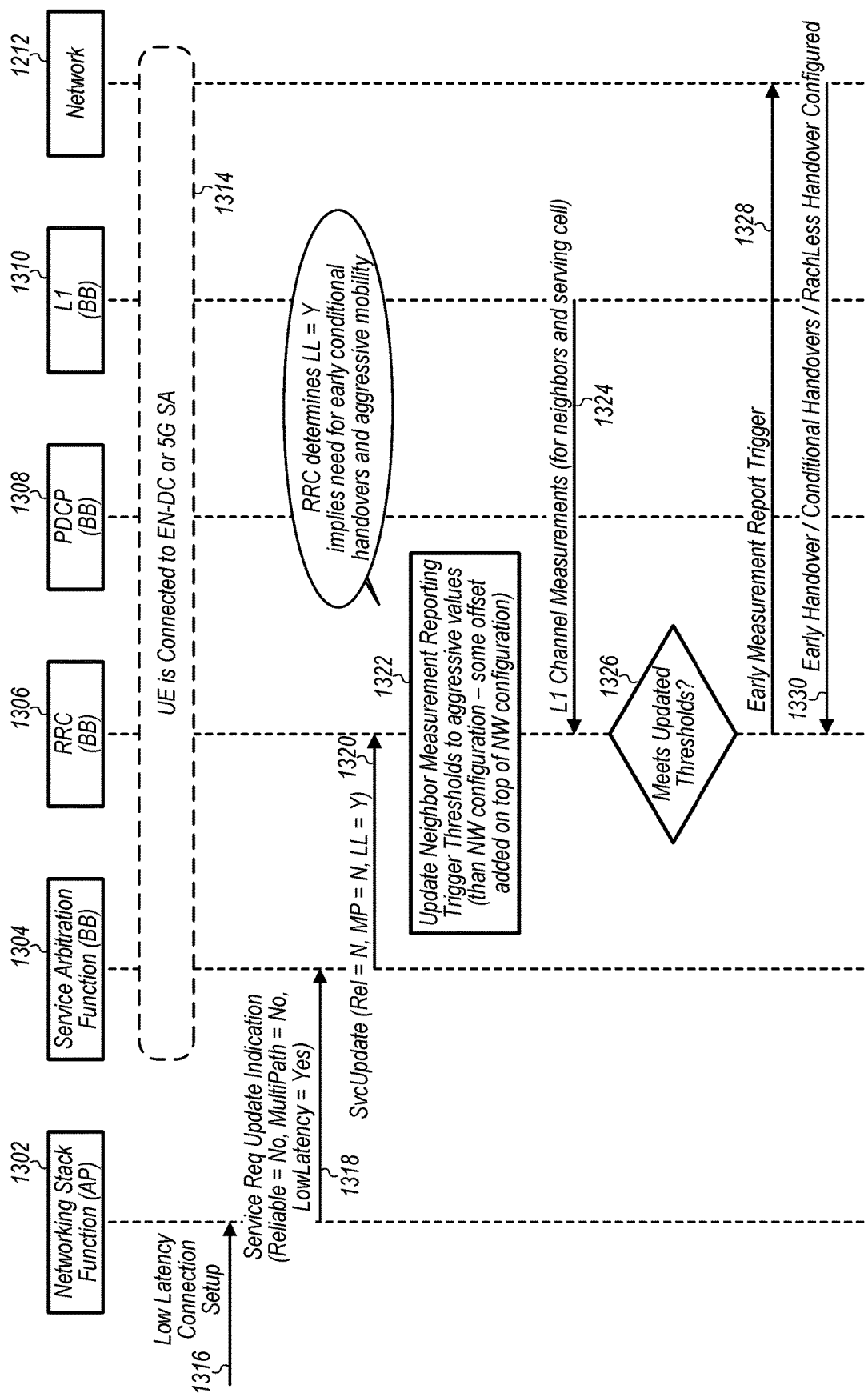
FIG. 13 is a communication flow diagram illustrating a method to implement service tagging communications between the AP and the BB to implement aggressive handover protocols, according to some embodiments.

FIG. 13—Aggressive Handover

FIG. 13 is a communication flow diagram illustrating a method to implement service tagging communications between the AP 1302 and the BB 1304-1310 to implement aggressive handover protocols, according to some embodiments. The method described in FIG. 13 may be implemented subsequent to establishment of an EN-DC connection or a 5G SA connection between the UE and the network.

As illustrated, at 1316 the AP may receive a notification of a preference for a low latency connection for an upcoming data session. At 1318, the AP may inform the BB of the preference for the low latency connection, and at 1320 the SAF 1304 may forward the preference information to the RRC layer 1306 of the BB. In response, at 1322 the RRC layer may configure itself according to the indicated preference for a low latency connection. For example, as illustrated, the RRC layer may determine that low latency implies a preference for early conditional handovers and aggressive mobility. The RRC layer may update neighbor measurement reporting trigger thresholds to aggressive values (e.g., by adding an offset on top of the network configuration), and at 1324 may perform L1 channel measurements for neighboring cells and/or the serving cell. At 1326, if it is determined that the channel measurements meet the updated thresholds, at 1328 the RRC layer may transmit an early measurement report trigger to the network, and in response, at 1330 the network may configure an early handover, a conditional handover, and/or a random access channel (RACH)-less handover.

Figure 14:
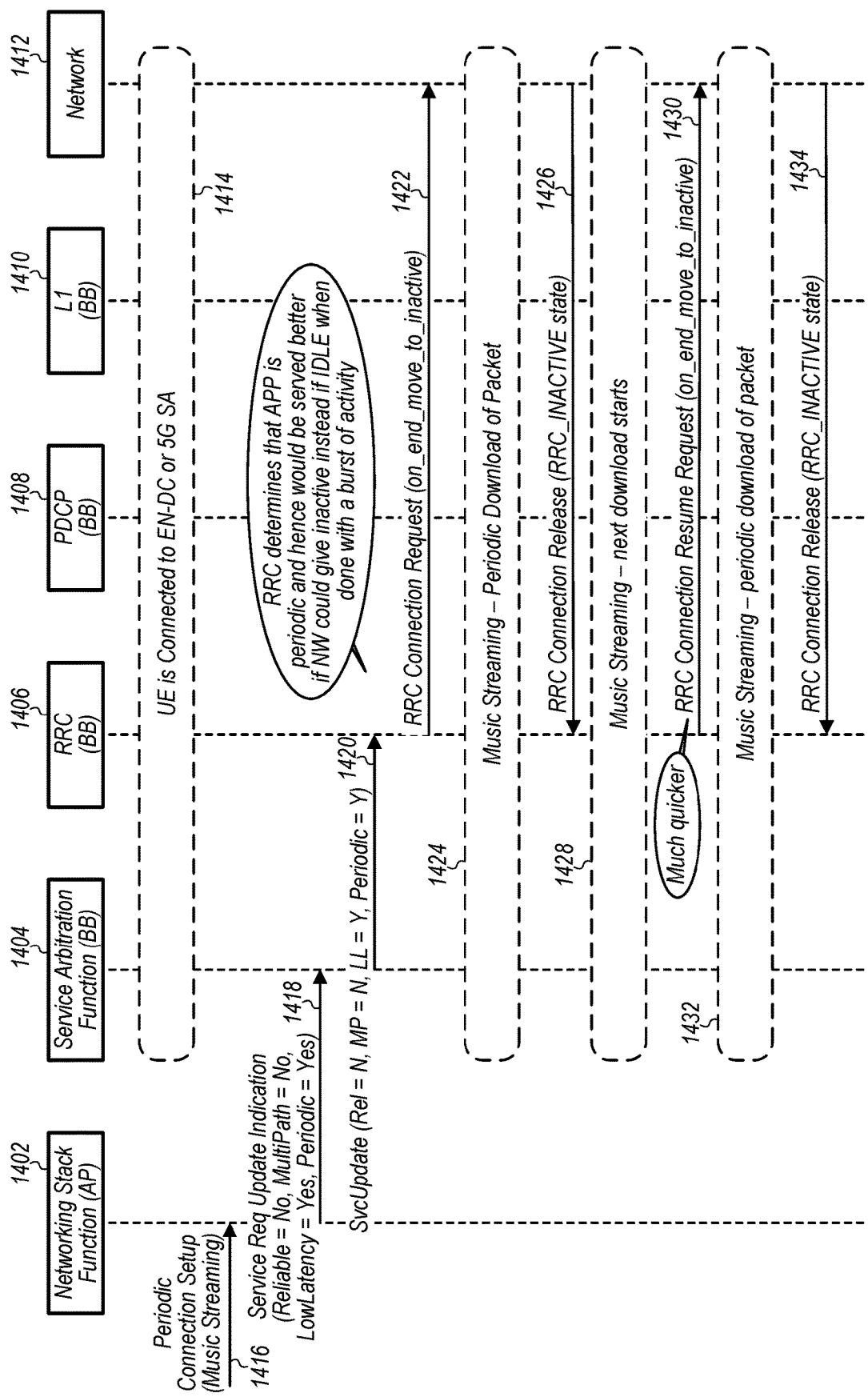
FIG. 14 is a communication flow diagram illustrating a method to implement service tagging communications between the AP and the BB to establish an RRC inactive state, according to some embodiments.

FIG. 14—RRC Inactive State

FIG. 14 is a communication flow diagram illustrating a method to implement service tagging communications between the AP and the BB 1404-1410 to establish an RRC inactive state, according to some embodiments. The method described in FIG. 14 may be implemented subsequent to establishment of an EN-DC connection or a 5G SA connection at step 1414 between the UE and the network.

As illustrated, at 1416 the NSF 1402 of the AP may receive a request to set up a periodic connection for an upcoming data session, such as a music streaming session. In response, at 1418 the NSF may send an indication to the SAF of the BB indicating a preference for a low latency periodic connection. At 1420, the SAF may forward this indication information to the RRC layer of the BB, which may determine that, since the upcoming data session will be periodically active, the UE experience may be improved if the network configured an RRC inactive connection instead of an RRC idle connection upon completion of each periodic burst of activity of the upcoming streaming session. At 1422, the RRC layer may then transmit an RRC connection request to the network that includes a preference to move the connection to inactive upon completion of data transmissions of the data session.

Subsequent to transmitting the RRC connection request to the network, the UE may initiate the data session (e.g., the music streaming session 1424), and may download a first packet of a periodic sequence of packets associated with the data session. After completing the packet download, at 1426, the UE may receive an RRC connection release message from the network, causing the UE to enter an RRC_INACTIVE state. Subsequently, when downloading of the next packet of the period sequence of packets is initiated at step 1428, at 1430 the BB may transmit an RRC connection resume request to the network to transition from RRC_INACTIVE to RRC_CONNECTED, and the subsequent packet may be downloaded at step 1432. Advantageously, the transition from RRC_INACTIVE to RRC_CONNECTED may occur much quicker than if the UE transitioned to RRC_IDLE after downloading each data packet, reducing latency and improving the user experience of the periodic data session. Finally, at step 1434, after completing the packet download, the UE may receive an RRC connection release message from the network, causing the UE to enter an RRC_INACTIVE state.

Per Data Packet Tagging

In some embodiments, fine-grained control over QOS preferences may be implemented on a per data packet basis that may bias certain subsets of traffic over a single 5G NR carrier aggregated or EN-DC RRC Connection. For example, the AP may tag all uplink internet protocol (IP) packets generated by the AP that need to be sent over-the-air via a cellular interface with one or more QOS preferences. The AP Networking Stack may perform deep packet inspection (DPI), wherein specific fields of the IP packets are inspected, before submission of IP Packets to the BB. For example, the source IP address or port, the destination IP address or port, the type of protocol, or other characteristics of the IP packets may be inspected according to DPI. The AP Networking Stack may be aware of data received from certain transmission control protocol (TCP) and/or IP sockets (e.g., an IP socket associated with a particular client such as a music streaming client, etc.) and may tag it directly with the appropriate QOS preference.

FIG. 15 is a table illustrating three different examples of per data packet tags, and example application types that may utilize each of the per data packet tags. As illustrated, a tag for multipath data with a subflow indication may be utilized for data packets associated with a virtual personal assistant application. An ultra-reliable data tag may be beneficial for a data packet associated with a virtual personal assistant application, a health monitor application, a real-time video application, or a smart car application. An ultra-low latency data tag may be beneficial for an augmented reality application, a navigation application, or a smart home/smart appliance application, among other possibilities.

Multipath Tagged Data

In some embodiments, the AP may specify a preference to utilize multipath communications for an upcoming data session and/or for one or more data packets of an upcoming data session. In these embodiments, multipath communications may be implemented according to one or more of the following methods.

5G NR communications may improve reliability by utilizing multiple sub-flows for multipath packets. NR-PDCP may be associated with one or more RLC entities in EN-DC, thereby providing built in link diversity. Alternatively or additionally, carrier aggregation (CA) may be used to provide link diversity. Out-of-order-delivery may be supported by the NR-PDCP layer in uplink (e.g., at the network side) and in downlink (e.g., at the UE side). Hence, a re-ordering delay at the receiving entity may be avoided.

Figure 16:
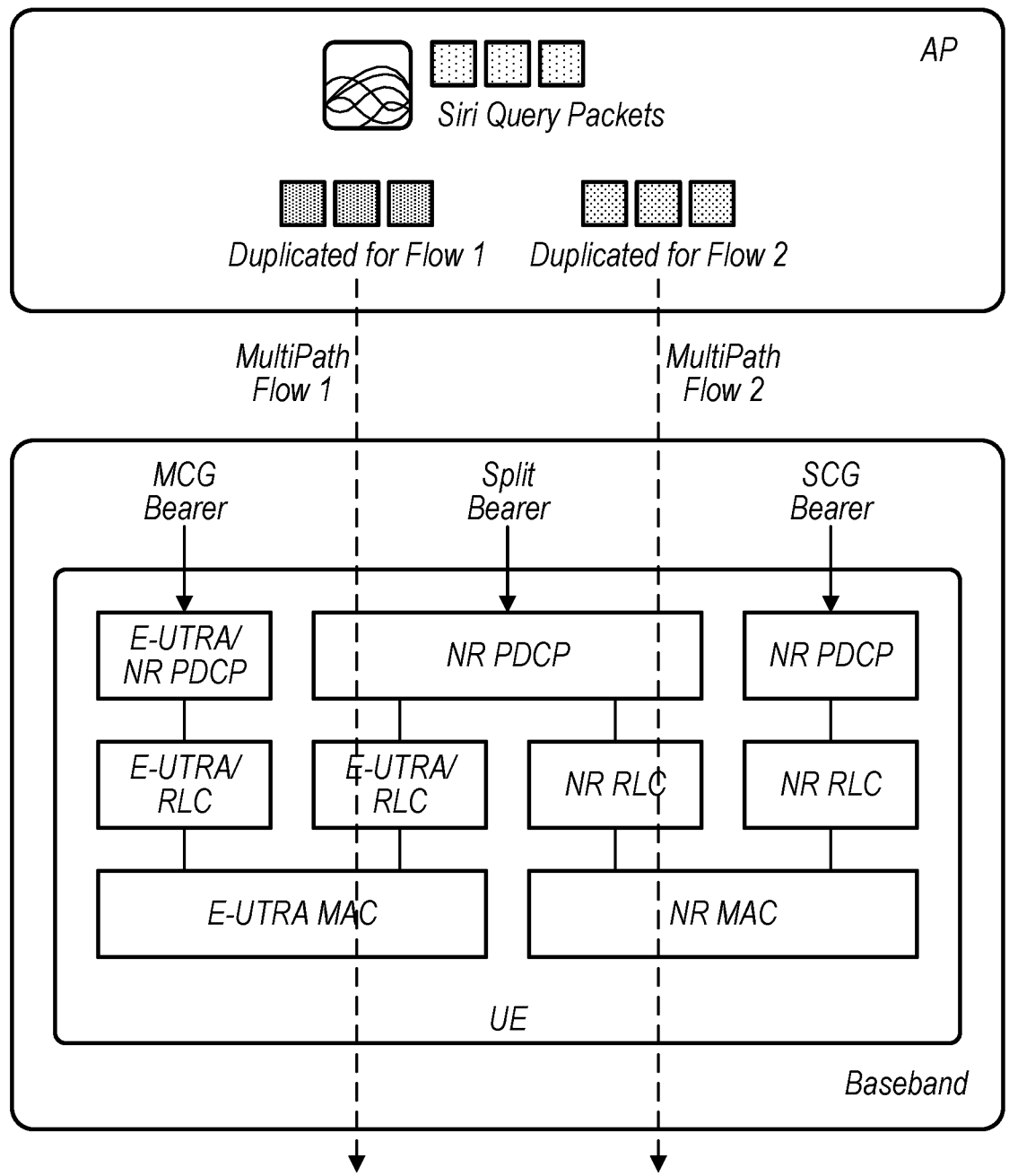
FIG. 16 illustrates an example protocol stack for a UE to implement a multipath flow, according to some embodiments.

FIG. 16 illustrates an example protocol stack for a UE to implement a multipath flow to increase reliability and/or to increase throughput while using a virtual personal assistant application. As illustrated, query packets may be duplicated by the AP into a first subflow and a second subflow, and each of the duplicated packets may be transmitted through an EN-DC split bearer of the BB for uplink transmission.

Figure 17A:
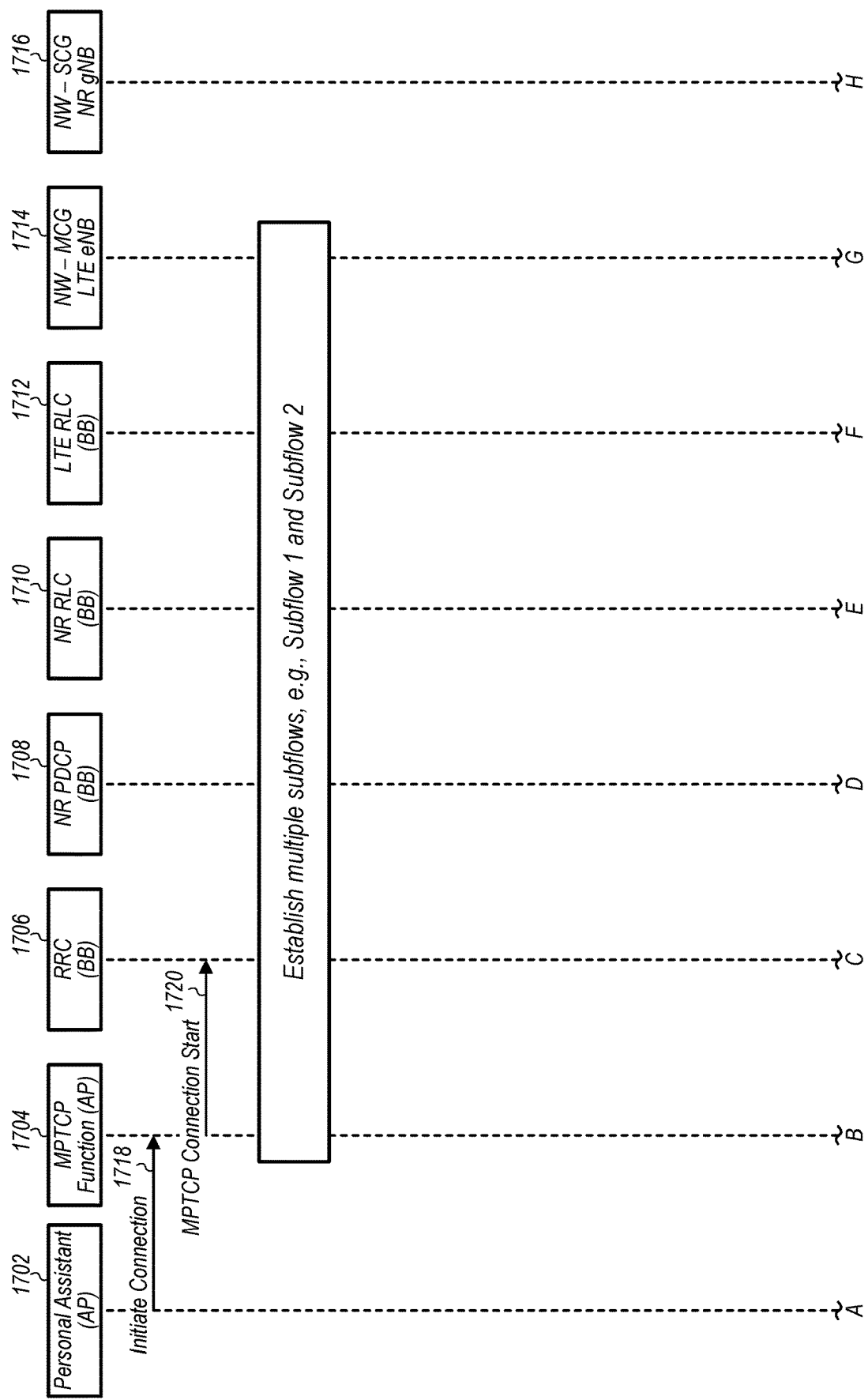
FIGS. 17A-B are a more detailed communication flow diagram illustrating a method for implementing multipath subflows, according to some embodiments.
Figure 17B:
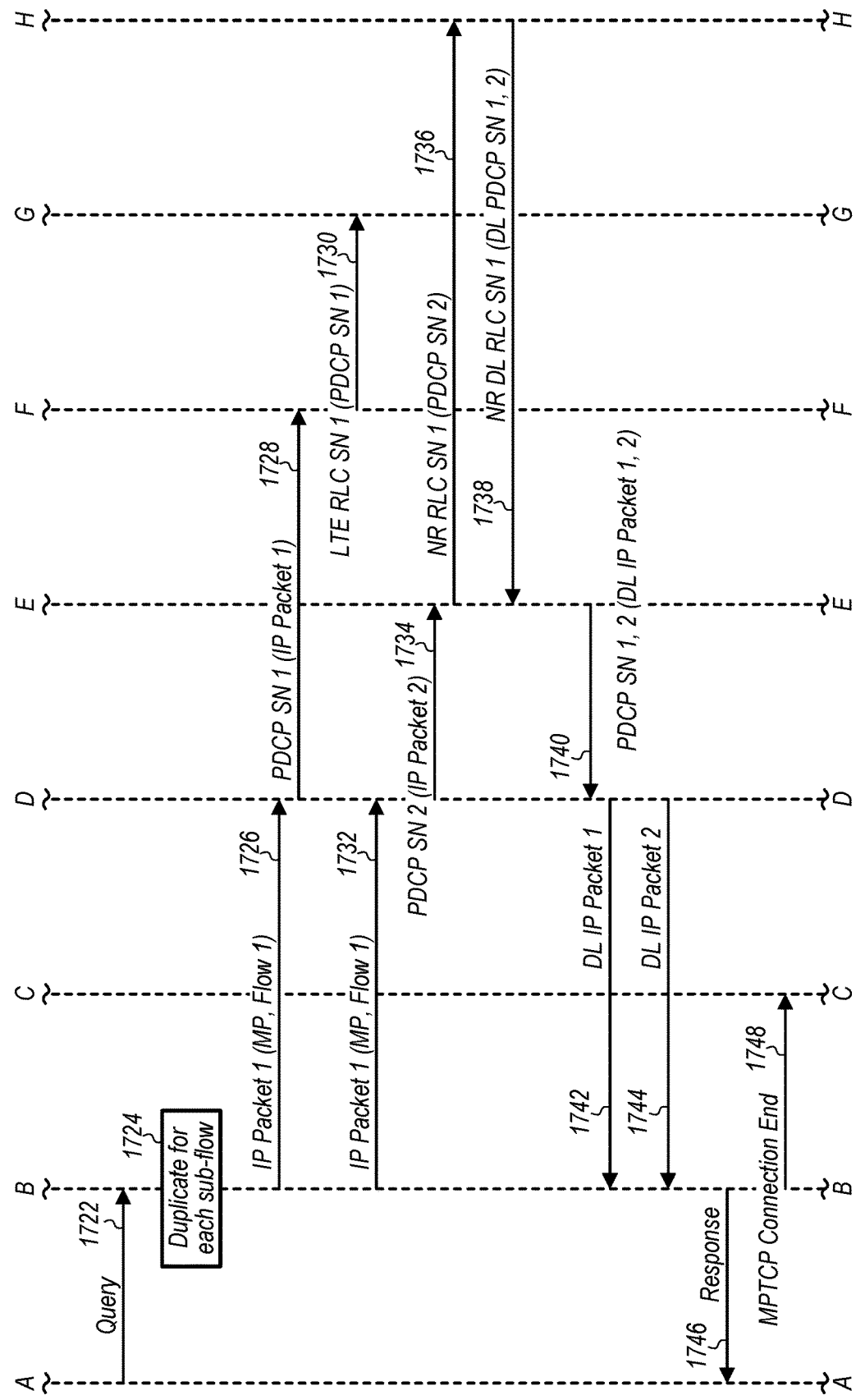

FIGS. 17A-B describe a more detailed communication flow diagram illustrating a method for implementing multipath subflows, according to some embodiments. As illustrated, a personal assistant (AP) 1702 (or another application running on the UE) may instruct the MPTCP function (1704) in the AP to initiate a connection at step 1718. At 1720, the AP may instruct the BB to start an MPTCP connection and establish multiple subflows such as Subflow 1 and Subflow 2.

At 1722, a query may be received by the AP. At 1724, packets received from an application 1702 running on the AP may be duplicated as two separate flows 1726 and 1732, and transmitted via the BB on each of the two subflows at steps 1728, 1730, 1734, and 1736 utilizing a multipath communication protocol.

Multipath TCP (MPTCP) may be used by the AP to satisfy reliability requirements over a 5G cellular connection. Typically, MPTCP uses at least 2 IP interfaces, but it may also work over a single IP interface depending on the configuration of the connection (e.g., since in this case the cellular baseband may provide a single IP address for multiple MPTCP sub-flows). Initial sub-flows for MPTCP with the MP_CAPABLE option may be established with the server. Data for the initial handshake may remain untagged, allowing the cellular baseband to transmit that flow over either RLC entity.

A second sub-flow with the key from the initial sub-flow may be established with the server. This data may additionally remain untagged, if desired. Future data generated by the AP may be tagged as "Multipath" data, and the tag may further include a sub-flow identifier. The BB may submit the data tagged with sub-flow 1 to Link 1 and may submit data tagged with sub-flow 2 to Link 2.

In some embodiments, data may arrive simultaneously from both sub-flows at the cellular baseband, and NR-PDCP may add contiguous PDCP sequence numbers to data to be sent over one link at 1738, before sequencing data to be sent over the second link. This may reduce reordering delays at the receiving entity on the network side, in case it does not support the out-of-order delivery feature that is native to NR PDCP.

In some embodiments, the AP may also inform the BB that a MPTCP connection is ongoing. In response, the BB may try to get link diversification from the NW if it is not already set up. Unfortunately, downlink data from the server to the UE may not employ similar link diversification, as the protocols of exchange-to-exchange (E2E) are not under UE control. However, this may not affect the UE operation as the NR-PDCP entity inside the UE may support out-of-order delivery to the AP, thereby delivering all required data quickly without incurring reordering delays.

Accordingly, at 1740 the NR RLC layer may transmit the tagged DL IP packet to the NR PDCP layer of the BB, which may subsequently transmit both packet 1 and packet 2 to the MPTCP function at steps 1742 and 1744, respectively. Finally, the MPTCP function may send a response comprising the DL packets to the application at step 1746, and transmit a notification to the RRC layer to end the MPTCP connection at step 1748.

Method to Handle UltraReliable Packets in 5G

In some embodiments, the AP may specify a preference to utilize enhanced reliability for an upcoming data session and/or for one or more data packets of an upcoming data session. In these embodiments, enhanced reliability may be implemented according to one or more of the following methodologies.

Figure 18:
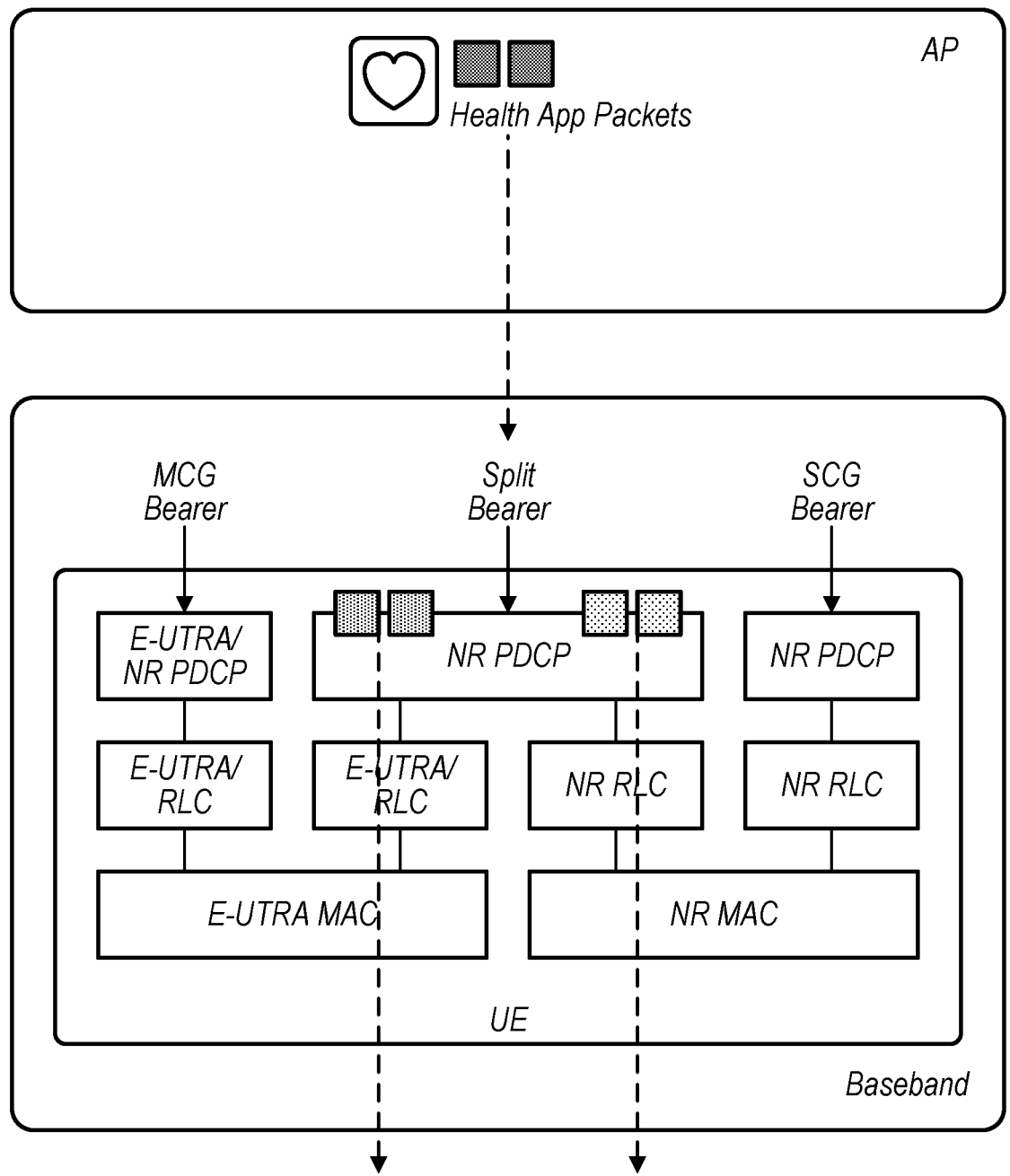
FIG. 18 illustrates an example protocol stack for utilizing packet redundancy to increase reliability of data packets, according to some embodiments.

FIG. 18 illustrates an example protocol stack for utilizing packet redundancy to increase reliability of data packets associated with an application that would benefit from enhanced reliability (e.g., a health monitoring application as illustrated, or another type of application), according to some embodiments. As illustrated, data packets received by the BB from a health monitoring application executing on the AP may be duplicated by the BB and transmitted to the network for increased reliability. The method illustrated in FIG. 18 differs from that illustrated in FIG. 16 at least in part because the data packets are duplicated by the BB in FIG. 18, rather than by the AP as in FIG. 16.

Figure 19:
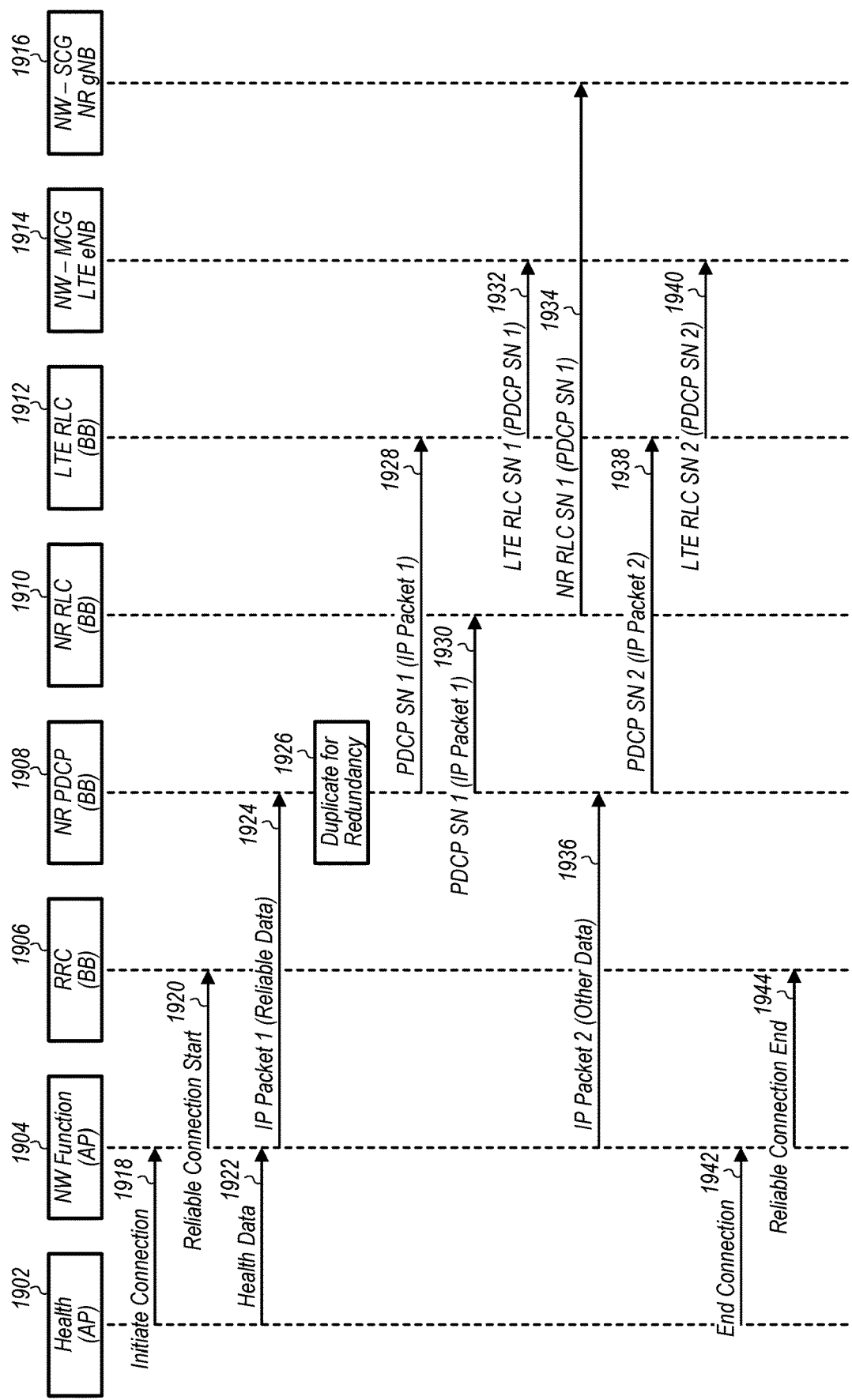
FIG. 19 is a detailed communication flow diagram illustrating a method to implement an enhanced reliability communication, according to some embodiments.

FIG. 19 is a detailed communication flow diagram illustrating a method to implement an enhanced reliability communication, according to some embodiments. As illustrated, at 1918 an application running on the UE 1902 (a health application is illustrated in FIG. 19, but other applications may also be used, in various embodiments) transmits instructions to a NW function 1904 of the AP to initiate a connection. At 1920, the NW function may inform the RRC layer 1906 of the BB to start a reliable connection.

After establishing a reliable connection, at 1922 the NW function may receive UL data from the application 1902 that is tagged for enhanced reliability (e.g., health data or other important data), and may provide this data as IP packet 1 to the NR PDCP layer of the BB at step 1924. At 1936, the BB may duplicate packets received from the AP and at 1928 and 1930 may transmit each of the duplicated packets through each of an LTE RLC layer and a NR RLC layer, respectively, to the network at step 1932 and 1934, respectively. When a second packet is received at step 1936 that is not tagged for enhanced reliability, the packet may be transmitted to an RLC layer of the BB at step 1938 and further transmitted to the network at step 1940 without duplication and utilizing only a single RLC entity (e.g., the LTE RLC entity as illustrated in FIG. 19, although the NR RLC entity may also be used). Finally, after completing the UL data transmission, at 1942 the application 1902 may instruct the NW function to end the connection, and the NW function may forward a reliable connection end instruction to the RRC layer at step 1944.

It is anticipated that in 5G NR, NR-PDCP may be associated with one or more RLC entities in EN-DC, thereby providing built-in link diversity. Additionally, NR-PDCP may support packet duplication, if configured and/or activated by the network. Additionally or alternatively, duplication may be performed by the UE irrespective of the network configuration, at the expense of extra bandwidth.

Applications such as virtual personal assistants (e.g., voice-activated assistants), health sensors and monitors, and smart car applications may take advantage of the reliability and redundancy provided by 5G NR via URLLC. Each uplink IP data packet associated with a service type that may be preferentially transmitted with enhanced reliability may be tagged with an "ultra reliable" flag by the AP.

In some embodiments, NR-PDCP may create a duplicate PDCP packet data unit (PDU) (e.g., with the same PDCP sequence number) for each UL IP Packet, and may submit the duplicate PDCP PDUs to the associated RLC entities. If the network has not enabled a PDCP duplication feature, NR-PDCP may implicitly assume PDCP duplication functionality for data tagged as reliable. This may consume extra bandwidth, but an inter-operation impact may be avoided as the PDCP at the receiving entity may discard the duplicate data.

In some embodiments, a new PDCP Control PDU or MAC CE may be defined by 3GPP to allow the UE to request a duplication feature. A 5G NR-capable device may implement a proprietary mechanism and request that the network enables PDCP Duplication. If the NR PDCP transmitting entity is associated with only 1 RLC transmit (TX) link, for a long-lasting flow (e.g., health record streaming or another long-lasting communication data session), the UE may fake a high BSR to cause the network to configure the second TX link.

Method to Handle Ultra-Low Latency Tagged Data

In some embodiments, the AP may specify a preference to utilize ultra-low latency for an upcoming data session and/or for one or more data packets of an upcoming data session. In these embodiments, ultra-low latency may be implemented according to one or more of the following methodologies.

It is anticipated that 5G NR may support UL Only RoHC in addition to UL/DL RoHC over User Datagram Protocol (UDP), TCP, and/or IP profiles. A uplink data session and/or one or more particular uplink data packets for which ultra-low latency is desired may be tagged with an "ultra-low latency" flag by the AP. Services such as real-time video chat and other voice-over IP (VOIP) services may reduce latency by enabling header compression. RoHC may reduce over-the-air data transfer considerably, thereby enabling reduced grant resource requirements in uplink, and reduced data transmission in marginal cellular conditions, leading to a more robust data transmission. If the network has not configured RoHC, proprietary signaling may be utilized to request an appropriate RoHC configuration from the network.

Feedback from Baseband to Application Processor for Uplink Transfer

In some embodiments, methods and devices are described to provide timely feedback from the BB to the AP regarding current network conditions, to facilitate effective and efficient QOS data tagging.

In these embodiments, information to be provided by the BB to the AP may be of various types. For example, link information may be provided as feedback that specifies a number of links that are active per bearer. "Links" may be taken to refer to as split bearers in EN-DC, or alternatively, UL/DL carrier aggregation links. The link information may be sent when the link(s) is/are de-configured, activated, and/or it may be periodically sent.

In these embodiments, the AP may initiate a multipath connection (e.g., MP-TCP or another type of multipath connection) or may provide additional reliability for key protocol packets (e.g., TCP SYN packets or other types of packets) by duplicating that data and associating it with one of the several active links indicated by the BB.

In some embodiments, the feedback information provided to the AP may comprise filtered or raw link quality information, such as a recent round trip time for data transmissions, single direction latencies, channel qualities using factors such as reference signal received power (RSRP), received signal code power (RSCP), signal-to-noise ratio (SNR), bandwidth, and/or resource availability, among other possibilities. This information may be sent periodically or when the quality changes by a threshold factor, as desired.

In some embodiments, the AP may intend to provide particular QOS preferences to multiple applications and the AP may rank which data and/or application communications are more important and/or urgent. However, if the AP is not aware of link channel conditions, it may choose to duplicate data for more than one link and provide that data to the BB. However, if some links are active but not good enough, the overall reliability goal may be diminished as the AP may duplicate more data for reliability (e.g., from multiple applications requesting duplication) irrespective of baseband capacity. Advantageously, supplying real-time feedback from the BB to the AP regarding current network conditions may enable the AP to more intelligently implement reliability-enhancing or other QOS protocols, taking into account the current network conditions. For example, in good network quality conditions, the AP may determine to not indicate a reliability enhancing QOS preference for data associated with one or more application types, if it is determined that the reliability enhancement is not necessary as a result of the good network quality conditions. Alternatively, the AP may indicate a preference for enhanced reliability for a larger number of types of data packets during poor network quality conditions.

Message Format for BB to AP Feedback

In various embodiments, the AP may be configured to receive one or more types of feedback from the BB. In some embodiments, the BB may send updates to the AP only if the AP may benefit from those updates (thereby saving costly power/wake-ups on AP-BB interface).

Figure 20A:
FIGS. 20A-C illustrate various message formats for feedback communicated from the BB to the AP, according to some embodiments.

The format of the BB to AP feedback information may take various forms. For example, as illustrated in FIG. 20A, the feedback may comprise a header field used to specify the packet data unit (PDU) type of the feedback information (the header field is 8 bits in FIG. 20A, but other sizes of the header are also possible). For example, a value of 1 in the PDU type field may indicate that the feedback is related to link status and other feedback information, while a value of 2 in the PDU type field may indicate that the feedback is an UL overflow indication. Other values of the PDU type field may be reserved for potential additional feedback types, such as an UL proxy acknowledgment indication. As illustrated, the header field is followed by a control PDU format field of variable size, which contains the feedback payload. Example structures for the control PDU format field for each of a link status and feedback message and an UL overflow indication message are illustrated in FIGS. 20B and 20C, respectively.

Figure 20B:
Figure 20C:
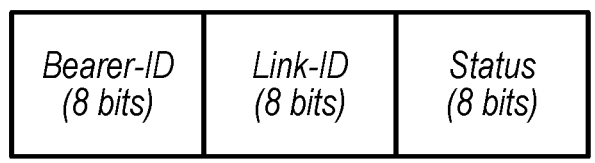

As illustrated in FIG. 20B, the control PDU format field for link status feedback may contain a bearer-ID (8 bits in FIG. 20B, or another size), which specifies the identity of the radio bearer, or the evolved packet system ID. The bearer-ID may be followed by an active link bitmap: Link 7 at the MSB, Link 0 at the LSB. Active Links will have the bit set.

Finally, the control PDU format field may contains a number of bits to specify the link status. As one example, the link status field may allocate 4 bits per link to specify the quality (e.g., round trip time, channel conditions, or other quality parameters) of that link, mapped to a value between 0 and 3 (e.g., 0 being poor, 3 being good).

The AP may utilize link status feedback in several ways, according to various embodiments. For example, the AP may utilize the feedback to implement an explicit congestion notification (ECN) procedure, to prioritize reliable data, or to change transport layer feedback mechanisms. For example, if one or more applications running on the AP each have a preferred reliability score between 0 and 10, and network status is supplied to the AP on a per-link basis, the AP may ensure that reliability goals are maintained for each application based on their reliability preferences in variable channel conditions.

As illustrated in FIG. 20C, the control PDU format field for UL overflow indication feedback may comprise a bearer-ID for which the overflow condition happens, a link-ID for which the overflow condition update happens, and a status field to indicate whether overflow is starting or ending. The AP may use this feedback information to stop creating multipath tagged data and/or duplicated data, among other possibilities. For example, overflow may be defined to occur by the BB when an amount of pending data exceeds a threshold, or if there are insufficient grant resources, or a very high round trip time (e.g., exceeding a threshold), among other possibilities.

Figure 21:
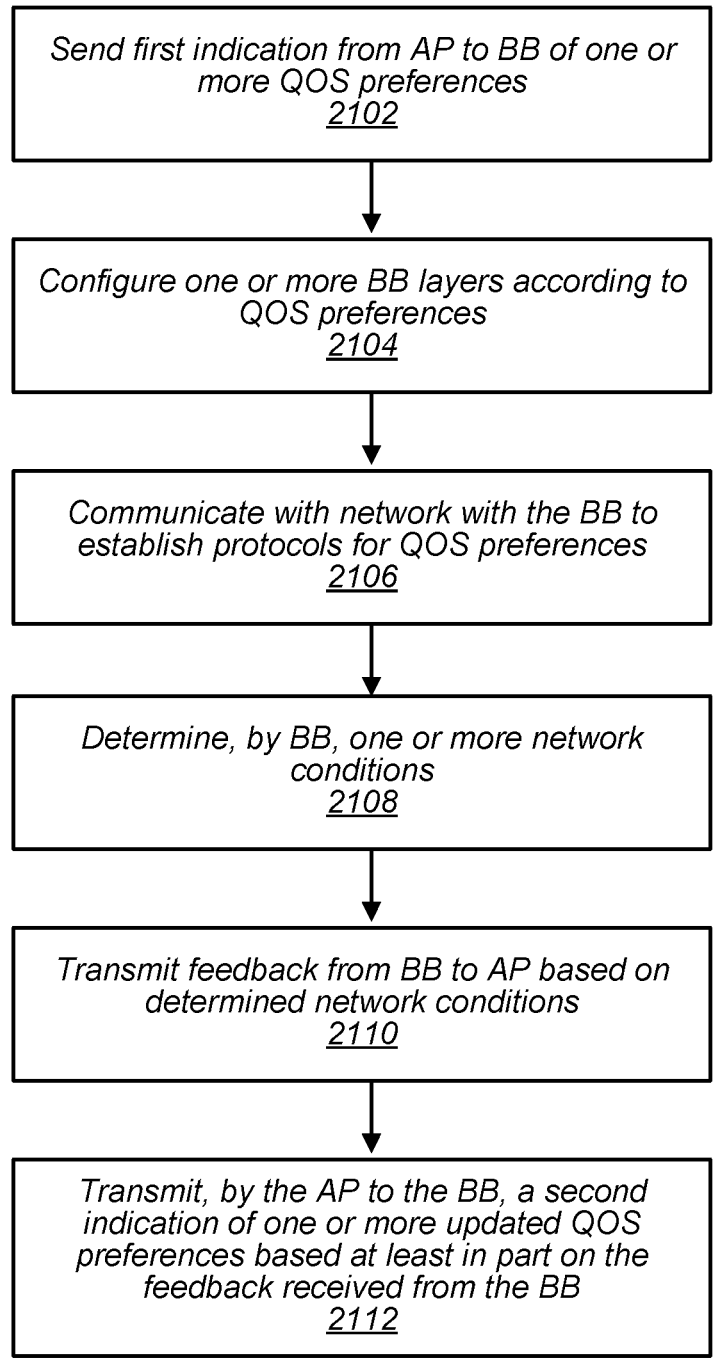
FIG. 21 is a flow chart diagram illustrating an exemplary method for implementing data quality of service preference tagging and BB to AP feedback, according to some embodiments.

FIG. 21—Communication Flow Diagram

FIG. 21 is a flow chart diagram illustrating a method for implementing data QOS preference tagging and BB to AP feedback, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 21 may be implemented by a wireless device, such as the UE 106 illustrated in and described with respect to FIG. 14, by one or more processors configured within a wireless device, or more generally in conjunction with any of the computer systems or devices shown in the above Figures, among other devices, as desired. Note that while at least some elements of the method of FIG. 21 are described in a manner relating to the use of communication techniques and/or features associated with LTE, 5G NR, OGRS, and/or 3GPP specification documents, such description is not intended to be limiting to the disclosure, and aspects of the method of FIG. 21 may be used in any suitable wireless communication system, as desired. As shown, the method may operate as follows.

At 2102, a first indication is sent from an application processor (AP) of the UE to a baseband processor (BB) of the UE of one or more quality of service preferences for an upcoming data session. In some embodiments, the one or more quality of service preferences comprises one or more of enhanced reliability, multipath communication, or low latency.

In some embodiments, said sending a first indication of the one or more quality of service preferences for the upcoming data session is performed for each of a plurality of uplink packets of the upcoming data session.

At 2104, one or more layers of the BB is configured according to the quality of service preferences. Depending on the quality of service preference, one or more layers of the BB may be configured to enable link diversity, to implement an aggressive handover protocol, to establish a multipath connection, or to duplicate data packets for enhanced reliability, among other possibilities.

At 2106, the BB communicates with a network to establish protocols for the quality of service preferences. In some embodiments, communicating with the network to establish protocols for the quality of service preferences comprises transmitting a request to the network using one of radio resource control (RRC) signaling, packet data convergence protocol (PDCP) signaling, media access control (MAC) buffer status report (BSR) signaling, or MAC control element (CE) signaling.

In some embodiments, the protocols for the quality of service preferences comprise one or more of an early handover protocol or an inactive radio resource control (RRC) state.

At 2108, the BB determines one or more network conditions. In some embodiments, the determined network conditions comprise a number of active links per radio bearer on the network. In some embodiments, the determined network conditions comprise one or more of a round trip time for data transmitted over the network, single direction latency, channel quality conditions, or available network bandwidth.

At 2110, the BB transmits feedback to the AP, wherein the feedback is based at least in part on the determined network conditions. For example, the BB may transmit feedback according to the format described in reference to FIGS. 20A-20C.

In some embodiments, the first indication comprises a preference for receiving information regarding one or more network conditions, and the one or more network conditions determined by the BB are selected based at least in part on the first indication.

At 2112, the AP sends a second indication of one or more updated quality of service preferences to the BB based at least in part on the feedback received from the BB. In some embodiments, the second indication of one or more updated quality of service preferences comprises an indication of a preference for a multipath connection. In these embodiments, the method may further comprise duplicating data for the upcoming data session, and transmitting the data over the active links.

Embodiments herein may be employed in a 5G NR communication system utilizing a large number of different types of devices and services, including but not limited to smart watches, smart TVs, connected cars, evolved multimedia broadcast multicast services (eMBMS), mobile TV services, software downloads, and/or emergency service notifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a user equipment device (UE), comprising:
    sending a first indication from an application processor (AP) of the UE to a baseband processor (BB) of the UE of one or more quality of service preferences for an upcoming data session;
    configuring one or more layers of the BB according to the quality of service preferences;
    communicating, by the BB, with a network to establish protocols for the quality of service preferences;
    determining, by the BB, one or more network conditions;
    transmitting feedback from the BB to the AP related to the determined network conditions; and
    sending, by the AP, a second indication of one or more updated quality of service preferences to the BB based at least in part on the feedback received from the BB.

2. The method of claim 1,
    wherein the determined network conditions comprise a number of active links per radio bearer on the network.

3. The method of claim 2,
    wherein the second indication of one or more updated quality of service preferences comprises an indication of a preference for a multipath connection; and
    wherein the method further comprises duplicating data for the upcoming data session, and transmitting the data over the active links.

4. The method of claim 1,
    wherein the determined network conditions comprise one or more of:
    a round trip time for data transmitted over the network;
    single direction latency;
    channel quality conditions; and
    available network bandwidth.

5. The method of claim 1,
    wherein the first indication comprises a preference for receiving information regarding one or more network conditions;
    wherein the one or more network conditions determined by the BB are selected based at least in part on the first indication.

6. The method of claim 1,
    wherein the one or more quality of service preferences comprise one or more of:
    enhanced reliability;
    multipath communication; and
    low latency.

7. The method of claim 1,
    wherein communicating with the network to establish protocols for the quality of service preferences comprises transmitting a request to the network using one of:
    radio resource control (RRC) signaling;
    packet data convergence protocol (PDCP) signaling;
    media access control (MAC) buffer status report (BSR) signaling; or
    MAC control element (CE) signaling.

8. The method of claim 1,
    wherein the protocols for the quality of service preferences comprise one or more of:
    an early handover protocol; and
    an inactive radio resource control (RRC) state.

9. The method of claim 1,
    wherein said sending the first indication of the one or more quality of service preferences for the upcoming data session is performed for each of a plurality of uplink packets of the upcoming data session.

10. A user equipment device (UE), comprising:
    an antenna;
    a radio operably coupled to the antenna; and
    a processor operably coupled to the radio;
    wherein the antenna, radio, and processor are configured to:
        send a first indication from an application processor (AP) of the UE to a baseband processor (BB) of the UE of one or more quality of service preferences for an upcoming data session;
        configure one or more layers of the BB according to the quality of service preferences;

communicate, by the BB, with a network to establish protocols for the quality of service preferences;

determine, by the BB, one or more network conditions;

transmit feedback from the BB to the AP related to the determined network conditions; and send, by the AP, a second indication of one or more updated quality of service preferences to the BB based at least in part on the feedback received from the BB.

11. The UE of claim 10,
wherein the determined network conditions comprise a number of active links per radio bearer on the network.

12. The UE of claim 11,
wherein the second indication of one or more updated quality of service preferences comprises an indication of a preference for a multipath connection, and
wherein the antenna, radio and processor are further configured to:
duplicate data for the upcoming data session; and
transmit the data over the active links.

13. The UE of claim 10,
wherein the determined network conditions comprise one or more of:
a round trip time for data transmitted over the network;
single direction latency;
channel quality conditions; and
available network bandwidth.

14. The UE of claim 10,
wherein the first indication comprises a preference for receiving information regarding one or more network conditions;
wherein the one or more network conditions determined by the BB are selected based at least in part on the first indication.

15. The UE of claim 10,
wherein said sending the first indication of the one or more quality of service preferences for the upcoming data session is performed for each of a plurality of uplink packets of the upcoming data session.

16. The UE of claim 10,
wherein the one or more quality of service preferences comprise one or more of:
enhanced reliability;
multipath communication; and
low latency.

17. A computer-readable non-transitory memory medium comprising program instructions that, when executed by a processor of a user equipment device (UE), cause the UE to:
send a first indication from an application processor (AP) of the UE to a baseband processor (BB) of the UE of one or more quality of service preferences for an upcoming data session;
configure one or more layers of the BB according to the quality of service preferences;
communicate, by the BB, with a network to establish protocols for the quality of service preferences;
determine, by the BB, one or more network conditions;
transmit feedback from the BB to the AP related to the determined network conditions; and
send, by the AP, a second indication of one or more updated quality of service preferences to the BB based at least in part on the feedback received from the BB.

18. The computer-readable non-transitory memory medium of claim 17,
wherein the determined network conditions comprise a number of active links per radio bearer on the network,
wherein the second indication of one or more updated quality of service preferences comprises an indication of a preference for a multipath connection, and
wherein the method further comprises duplicating program instructions are further executable by the processor to cause the UE to:
duplicate data for the upcoming data session; and
transmit the data over the active links.

19. The computer-readable non-transitory memory medium of claim 17,
wherein communicating with the network to establish protocols for the quality of service preferences comprises transmitting a request to the network using one of:
radio resource control (RRC) signaling;
packet data convergence protocol (PDCP) signaling;
media access control (MAC) buffer status report (BSR) signaling; or
MAC control element (CE) signaling.

20. The computer-readable non-transitory memory medium of claim 17,
wherein the protocols for the quality of service preferences comprise one or more of:
an early handover protocol; and
an inactive radio resource control (RRC) state.

* * * * *